United States Patent
Choi

(10) Patent No.: US 10,414,422 B2
(45) Date of Patent: Sep. 17, 2019

(54) INFANT WAGON HAVING IMPROVED CONVENIENCE OF USE

(71) Applicant: BRAN-NEW INTERNATIONAL, Seoul (KR)

(72) Inventor: Yejin Choi, Sacheon-si (KR)

(73) Assignee: BRAN-NEW INTERNATIONAL, Seoul (KR)

( * ) Notice: Subject to any disclaimer, the term of this patent is extended or adjusted under 35 U.S.C. 154(b) by 0 days.

(21) Appl. No.: 16/322,153

(22) PCT Filed: Aug. 30, 2017

(86) PCT No.: PCT/KR2017/009491
§ 371 (c)(1),
(2) Date: Jan. 31, 2019

(87) PCT Pub. No.: WO2018/044070
PCT Pub. Date: Aug. 3, 2018

(65) Prior Publication Data
US 2019/0185038 A1    Jun. 20, 2019

(30) Foreign Application Priority Data
Sep. 1, 2016 (KR) .......................... 10-2016-0112375

(51) Int. Cl.
*B62B 3/00* (2006.01)
*B62B 7/06* (2006.01)
(Continued)

(52) U.S. Cl.
CPC ................ *B62B 7/06* (2013.01); *B60B 33/00* (2013.01); *B60B 33/02* (2013.01); *B62B 3/00* (2013.01);
(Continued)

(58) Field of Classification Search
CPC .. B62B 3/027; B62B 3/02; B62B 3/07; B62B 3/025
See application file for complete search history.

(56) References Cited

U.S. PATENT DOCUMENTS 7,523,955 B2 * 4/2009 Blair .................. B62B 3/007
280/47.34
8,973,940 B2 * 3/2015 Chen .................. B62B 3/02
280/35
(Continued)

FOREIGN PATENT DOCUMENTS

JP   2013-241181 A   12/2013
KR   20-1988-0000610 Y1   3/1988
(Continued)

Primary Examiner — Hau V Phan
(74) Attorney, Agent, or Firm — Novick, Kim & Lee, PLLC; Jae Youn Kim

(57) ABSTRACT

Provided herein is an infant wagon having improved convenience of use, wherein the infant wagon includes a front frame, a rear frame, a support frame, side frames, a front handle frame, and a rear handle frame, and is configured such that the axial distance between front wheels and rear wheels thereof is reduced, whereby it is possible to easily switch between a usage mode and a storage mode, such that the structure of the wagon wheel unit is simplified to reduce production costs, whereby it is possible to achieve product competitiveness, such that, when the wheels are worn or damaged, it is possible to easily replace the wheels, and such that the front wheels and the rear wheels are compatible with each other and are interchangeable.

4 Claims, 18 Drawing Sheets

(51) Int. Cl.
*B62B 7/14* (2006.01)
*B62B 9/08* (2006.01)
*B62B 9/12* (2006.01)
*B60B 33/00* (2006.01)
*B60B 33/02* (2006.01)
*B62B 9/10* (2006.01)

(52) U.S. Cl.
CPC .................. *B62B 7/14* (2013.01); *B62B 9/08* (2013.01); *B62B 9/082* (2013.01); *B62B 9/12* (2013.01); *B62B 3/002* (2013.01); *B62B 9/10* (2013.01)

(56) References Cited

U.S. PATENT DOCUMENTS

| | | | |
|---|---|---|---|
| 9,145,154 B1* | 9/2015 | Horowitz | B62B 3/025 |
| 2008/0258435 A1* | 10/2008 | Blair | B62B 3/007 |
| | | | 280/639 |
| 2010/0090444 A1* | 4/2010 | Chen | B62B 3/007 |
| | | | 280/651 |
| 2015/0035258 A1* | 2/2015 | Chen | B62B 3/02 |
| | | | 280/651 |
| 2015/0151771 A1* | 6/2015 | Jin | B62B 3/027 |
| | | | 280/651 |
| 2015/0551771 | 6/2015 | Jin | |

FOREIGN PATENT DOCUMENTS

KR  10-1573235 B1  12/2015
KR  10-1626778 B1  6/2016

* cited by examiner

INFANT WAGON HAVING IMPROVED CONVENIENCE OF USE

TECHNICAL FIELD

The present invention relates to an infant wagon having improved convenience of use, wherein the infant wagon is configured such that the axial distance between front wheels and rear wheels thereof, which support the infant wagon, is reduced. Therefore, it is possible to reduce the force applied to the arms of a user such as a caregiver and to easily change the direction and manipulate the infant wagon in a small space. When the infant wagon is pushed, it is possible to prevent as much as possible a foot of the caregiver, which steps forwards, from colliding with a frame of the infant wagon, thereby allowing the caregiver to walk comfortably. The wheels of the infant wagon are easily attached and detached, whereby it is possible to reduce the volume of the infant wagon such that the infant wagon can be easily carried and stored.

BACKGROUND ART

A handcart type infant wagon has been rapidly popularized through word of mouth between parents of young children, and the importance of an infant wagon as an infant transport means has gradually increased because the infant wagon has a larger storage space than a baby carriage and is configured such that a caregiver can go out alone with two or three infants in the infant wagon. With the increased demand for infant wagons, various kinds of infant wagons have come onto the market.

In a conventional infant wagon, however, the axial distance between front wheels and rear wheels thereof, which support the infant wagon, is very long, and thus a large space is needed to change the direction of the infant wagon. In addition, since the axial distance is so long, it is not easy to change the direction of the infant wagon, whereby the arms of a caregiver may be overworked. Furthermore, since the foot of the caregiver, which steps forwards when the caregiver walks, collides with a rear frame of the infant wagon when the infant wagon is pushed from the rear thereof to move the infant wagon, the caregiver may not be able to continuously walk comfortably, and the fatigue of the caregiver may be increased.

Moreover, it is not easy to separate the wheels from the infant wagon when the infant wagon is not being used. Consequently, it is inconvenient to carry and store the infant wagon. Further, the structure of a brake is complicated, whereby production costs are increased. As a result, the purchase price of a product is increased, and therefore the burden on the consumer is heavier. What is more, when the wheels become worn or damaged, a large number of parts constituting the infant wagon must be replaced, and expenses for maintenance and repair are increased.

DISCLOSURE

Technical Problem

The present invention has been made in view of the above problems, and it is an object of the present invention to provide an infant wagon having improved convenience of use, wherein the infant wagon is configured such that the axial distance between front wheels and rear wheels thereof is reduced, whereby it is possible to reduce the burden applied to the arms of a caregiver when the infant wagon is pushed or when the direction of the infant wagon is changed, such that the radius of rotation of the infant wagon is reduced, whereby it is possible to easily change the direction of the infant wagon, such that, when the infant wagon is pushed from the rear thereof to move the infant wagon, it is possible to prevent as much as possible the foot of the caregiver, which steps forwards, from colliding with a rear frame of the infant wagon, such that the wheels are easily attached and detached, whereby it is possible to easily switch between a usage mode and a storage mode, such that the structure of the infant wagon is simplified to reduce production costs, whereby it is possible to achieve product competitiveness, and such that, when the wheels are worn or damaged, it is possible to easily replace the wheels.

Technical Solution

In accordance with the present invention, the above and other objects can be accomplished by the provision of an infant wagon having improved convenience of use, the infant wagon including a foldable main body frame, a wagon wheel unit, a seat unit, and a canopy unit, the infant wagon serving as an infant transport means, wherein the foldable main body frame includes a front frame, which is a '□'-shaped (square-like) frame disposed at the front end of the foldable main body frame so as to stand up straight in order to support the front of the foldable main body frame, a rear frame, which is a '⌐⌐'-shaped frame disposed at the rear end of the foldable main body frame so as to stand up straight, a lower end frame part of the rear frame being bent upwards so as to have a trapezoidal shaped recess, the rear frame being configured to support the rear of the foldable main body frame, a support frame, which is a rectangular frame coupled to inside lower ends of the front frame and the rear frame respectively, the support frame including a wagon middle shaft disposed at the middle thereof with respect to the forward-rearward direction, the support frame further including a front support frame and a rear support frame configured to be folded or unfolded in a symmetrical fashion in order to vary the shape of the support frame according to upward and downward movement of the wagon middle shaft, side frames, each of which has an upper side frame disposed horizontally and axially coupled to the upper end of the front frame and to the upper end of the rear frame in a symmetrical fashion, a lower side frame disposed horizontally and axially coupled to the lower end of the front frame and to the lower end of the rear frame in a symmetrical fashion, and a vertical connection frame, which stands up straight, having an upper end and a lower end axially coupled to the middle of the upper side frame and to the middle of the lower side frame, respectively, a front handle frame, which is a '⊓'-shaped frame located in front of the front frame, the front handle frame being coupled to a left and a right front portions of the front frame via handle fixing clips so as to stand up straight, and a rear handle frame, which is a '⊓'-shaped frame located at the rear of the rear frame, the rear handle frame being coupled to a left and a right rear portions of the rear frame via handle fixing clips so as to stand up straight, the rear handle frame being configured such that rotation control buttons are coupled to outsides of rotating shafts disposed at a left and a right upper ends of the rear handle frame in order to control the angle of a rear angle adjustment handle in a stepwise manner.

Advantageous Effects

As is apparent from the above description, the infant wagon according to the present invention has effects in that the axial distance between the front wheels and the rear wheels thereof is reduced, whereby it is possible to reduce the burden applied to the arms of a caregiver when the infant wagon is moved or when the direction of the infant wagon is changed, in that the radius of rotation of the infant wagon is reduced, whereby it is possible to easily change the direction of the infant wagon, in that, when the infant wagon is pushed from the rear thereof to move the infant wagon, it is possible to prevent as much as possible the foot of the caregiver, which steps forwards, from colliding with the rear frame of the infant wagon, whereby it is possible for the caregiver to walk comfortably and thus to reduce the fatigue of the caregiver, in that the wheels are easily attached and detached, whereby it is possible to easily switch between a usage mode and a storage mode, in that the structure of the wagon wheel unit is simplified to reduce production costs, whereby it is possible to achieve product competitiveness, in that, when the wheels become worn or damaged, it is possible to easily replace the wheels, and in that the front wheels and the rear wheels are compatible with each other and are interchangeable.

Figure 1:
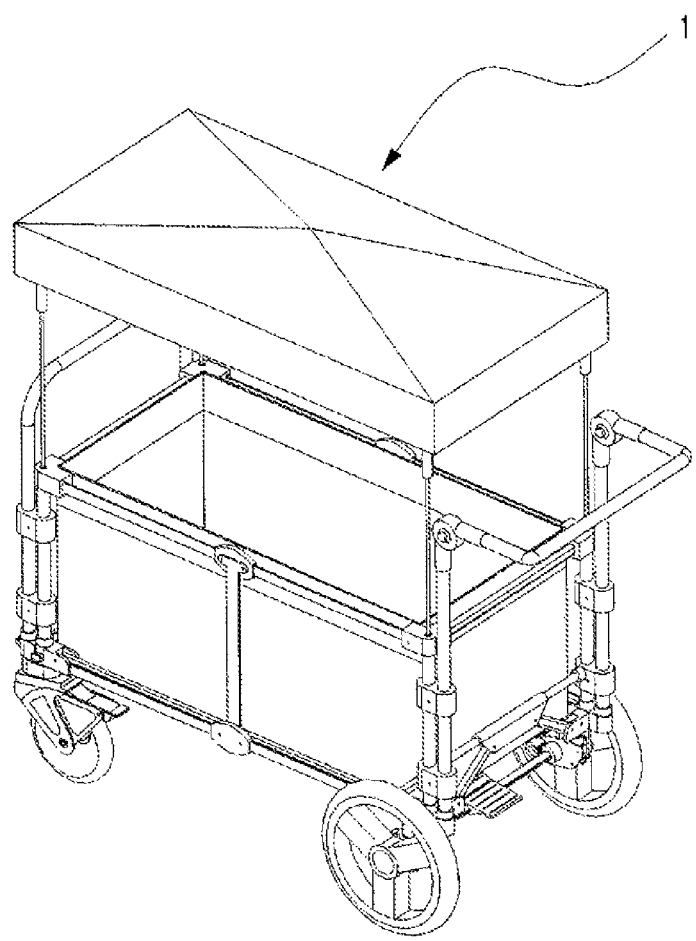
FIG. 1 is a perspective view showing the overall shape of an infant wagon having improved convenience of use according to the present invention.

1: Infant wagon 100: Foldable main body frame
110: Front frame 120: Rear frame
130: Support frame 140: Side frames
150: Front handle frame 160: Rear handle frame
200: Wagon wheel unit 210: Front wheel drive unit
211: Front wheel fixing frames 212: Front wheel shock absorption frames
213: Brake frames 214: Front wheels
220: Rear wheel drive unit 220a: First rear wheel drive unit 230a: Second rear wheel drive unit 300: Seat unit
400: Canopy unit

BEST MODE

The present invention provides an infant wagon having improved convenience of use, the infant wagon including a foldable main body frame 100, a wagon wheel unit 200, a seat unit 300, and a canopy unit 400, the infant wagon serving as an infant transport means, wherein the foldable main body frame 100 includes a front frame 110, which is a '□'-shaped frame disposed at the front end of the foldable main body frame so as to stand up straight in order to support the front of the foldable main body frame, a rear frame 120, which is a '⌐⌐'-shaped frame disposed at the rear end of the foldable main body frame so as to stand up straight, a lower end frame part of the rear frame being bent upwards so as to have a trapezoidal shaped recess, the rear frame being configured to support the rear of the foldable main body frame, a support frame 130, which is a rectangular frame coupled to inside lower ends of the front frame and the rear frame respectively, the support frame including a wagon middle shaft 131 disposed at the middle thereof with respect to the forward-rearward direction, the support frame further including a front support frame and a rear support frame configured to be folded or unfolded in a symmetrical fashion in order to vary the shape of the support frame according to upward and downward movement of the wagon middle shaft, side frames 140, each of which has an upper side frame disposed horizontally and axially coupled to the upper end of the front frame and to the upper end of the rear frame in a symmetrical fashion, a lower side frame disposed horizontally and axially coupled to the lower end of the front frame and to the lower end of the rear frame in a symmetrical fashion, and a vertical connection frame, which stands up straight, having an upper end and a lower end and axially coupled to the middle of the upper side frame and to the middle of the lower side frame, respectively, a front handle frame 150, which is a '⌐'-shaped frame located in front of the front frame, the front handle frame being coupled to a left and a right front portions of the front frame via handle fixing clips 113 so as to stand up straight, and a rear handle frame 160, which is a '⌐'-shaped frame located at the rear of the rear frame, the rear handle frame being coupled to a left and a right rear portions of the rear frame via handle fixing clips 113 so as to stand up straight, the rear handle frame being configured such that rotation control buttons are coupled to outsides of rotating shafts formed at left and right upper ends of the rear handle frame in order to control the angle of a rear angle adjustment handle in a stepwise manner.

Mode for Invention

Hereinafter, preferred embodiments of the present invention will be described with reference to the accompanying drawings.

FIG. 1 is a perspective view showing the overall shape of an infant wagon having improved convenience of use according to the present invention. The infant wagon includes a foldable main body frame 100, a wagon wheel unit 200, a seat unit 300, and a canopy unit 400.

The foldable main body frame 100 according to the present invention will be described first.

The foldable main body frame 100 is formed to have a rectangular parallelepiped shape so as to support the entire main body of the infant wagon, denoted by reference numeral 1. The foldable main body frame 100 is configured such that the middle part of the foldable main body frame 100 is folded or unfolded in the forward-rearward direction, whereby the shape of the foldable main body frame 100 is variable.

Figure 2:
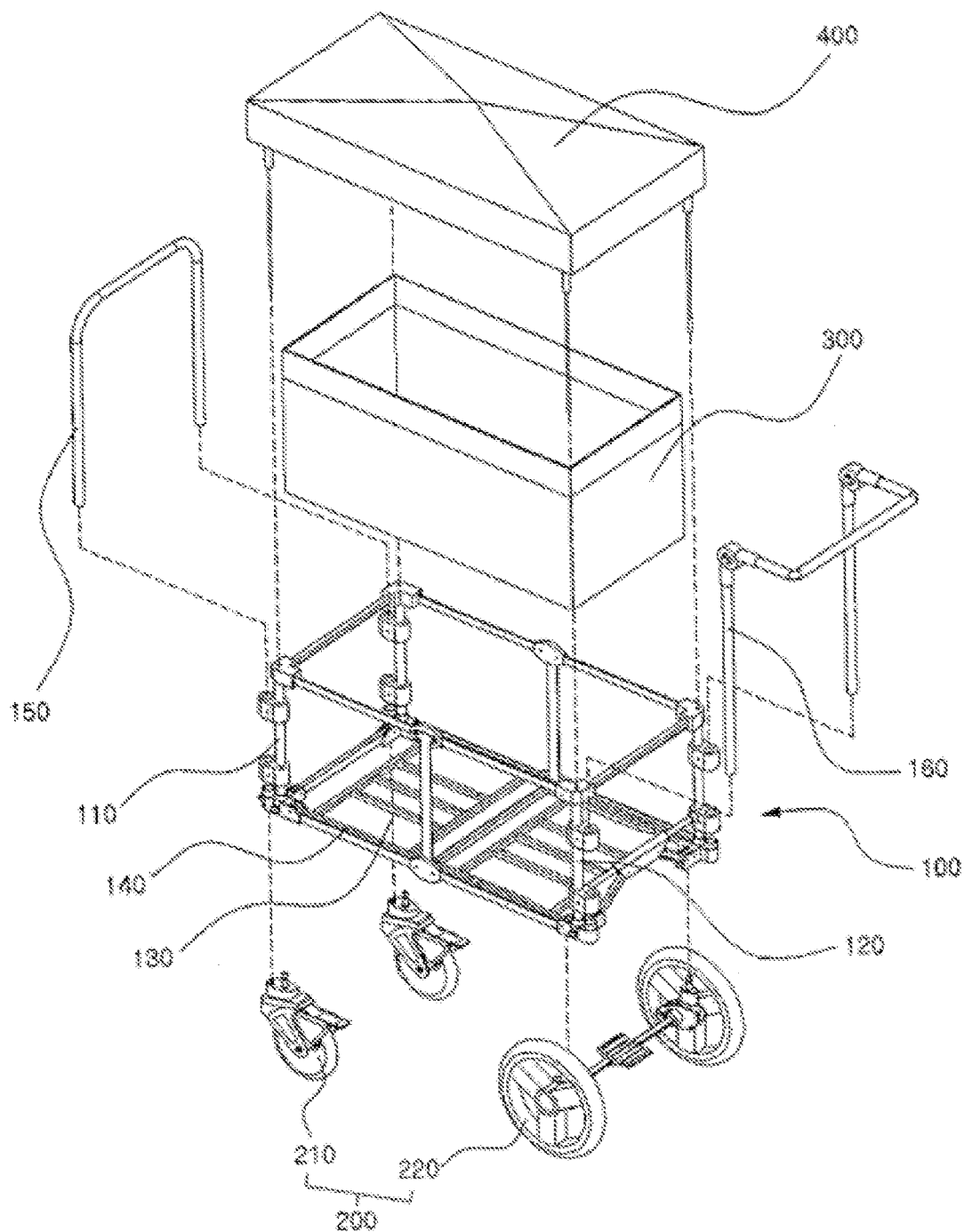
FIG. 2 is an exploded perspective view showing the structural elements of the infant wagon according to the present invention.

As shown in FIG. 2, the foldable main body frame 100 includes a front frame 110, a rear frame 120, a support frame 130, side frames 140, a front handle frame 150, and a rear handle frame 160.

First, the front frame 110 according to the present invention will be described.

Figure 3:
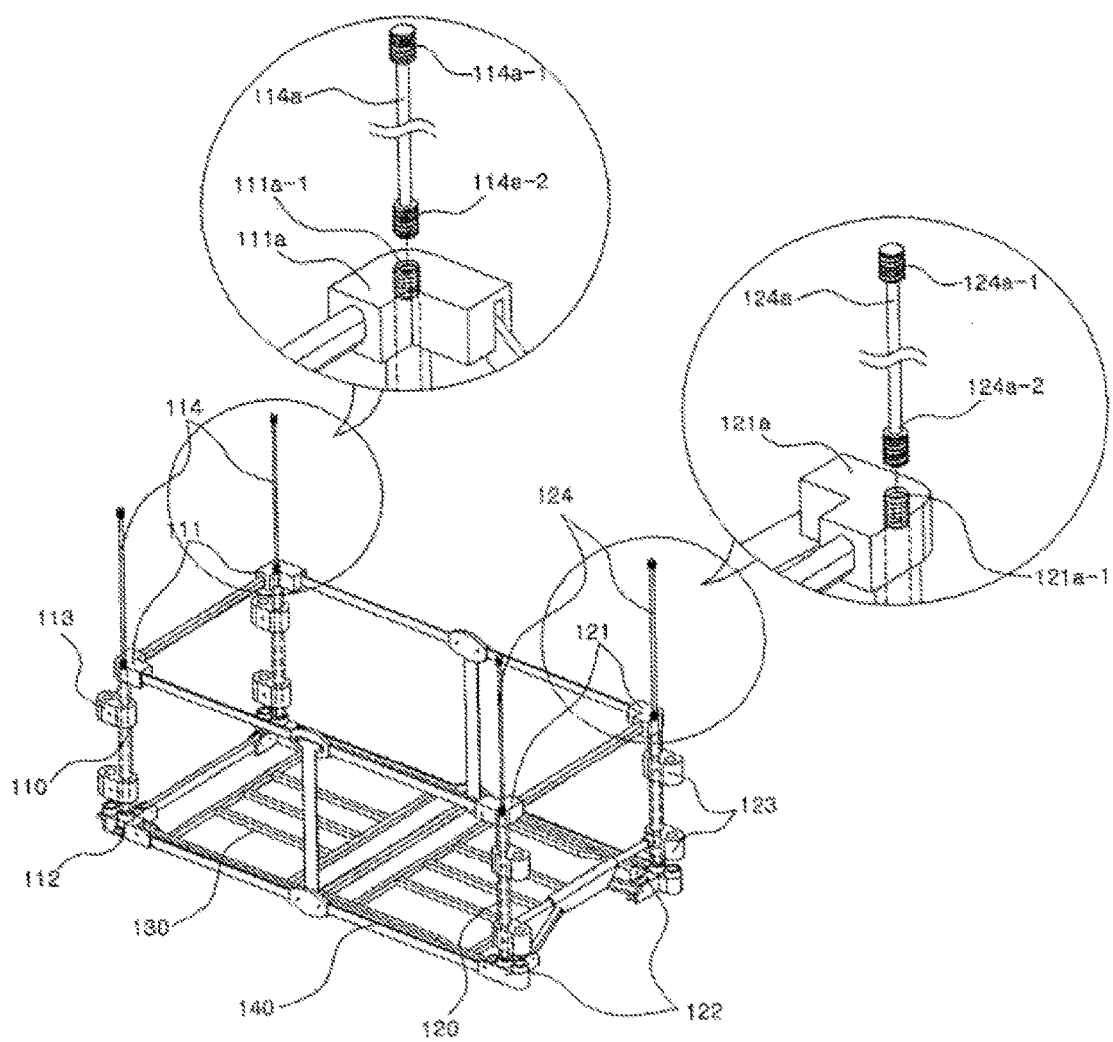
FIG. 3 is a view showing a front frame, a rear frame, a support frame, and side frames according to the present invention, with a partially enlarged view showing a way in which a first canopy pole is inserted into a first upper end two-axis support fixing member.
Figure 4:
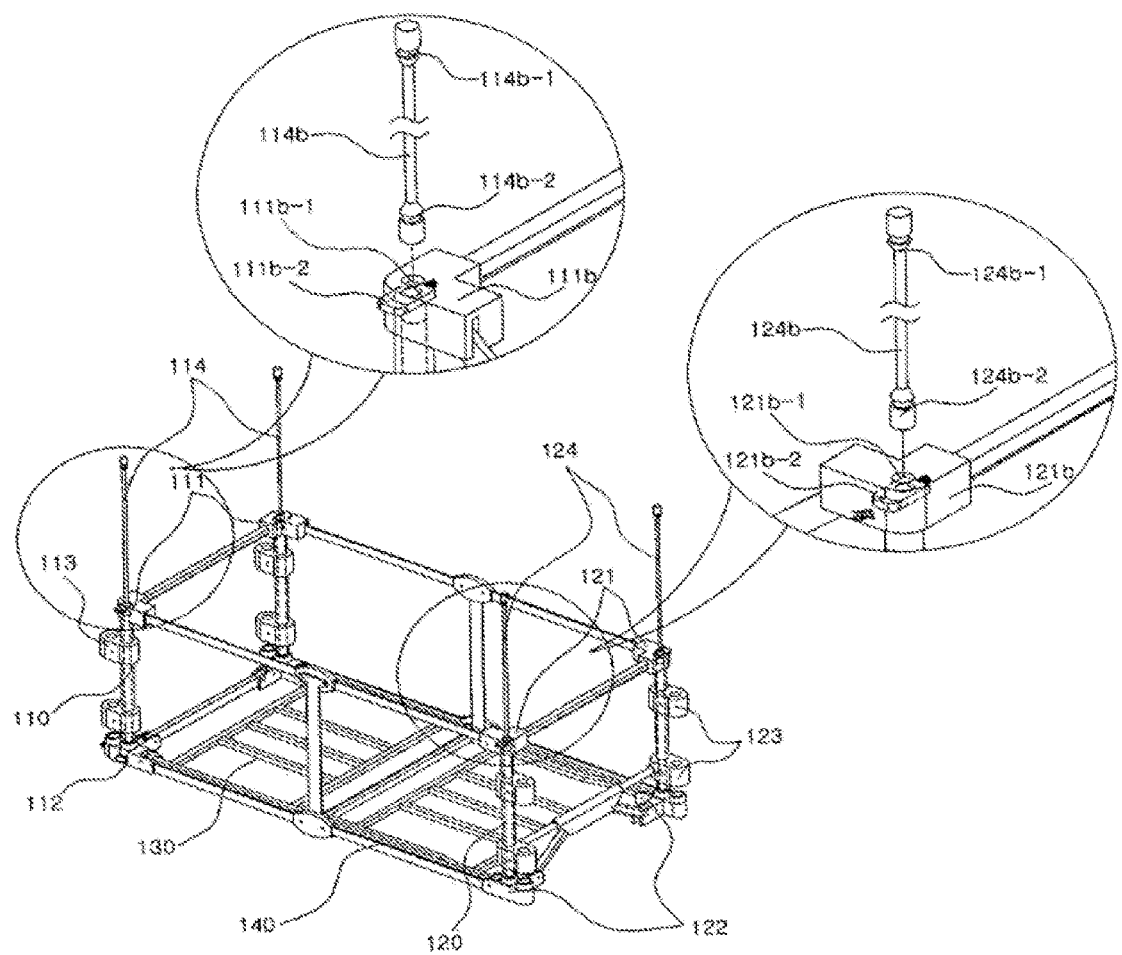
FIG. 4 is a view showing the front frame, the rear frame, the support frame, and the side frames according to the present invention, with a partially enlarged view showing a way in which a second canopy pole is inserted into a second upper end two-axis support fixing member.
Figure 5:
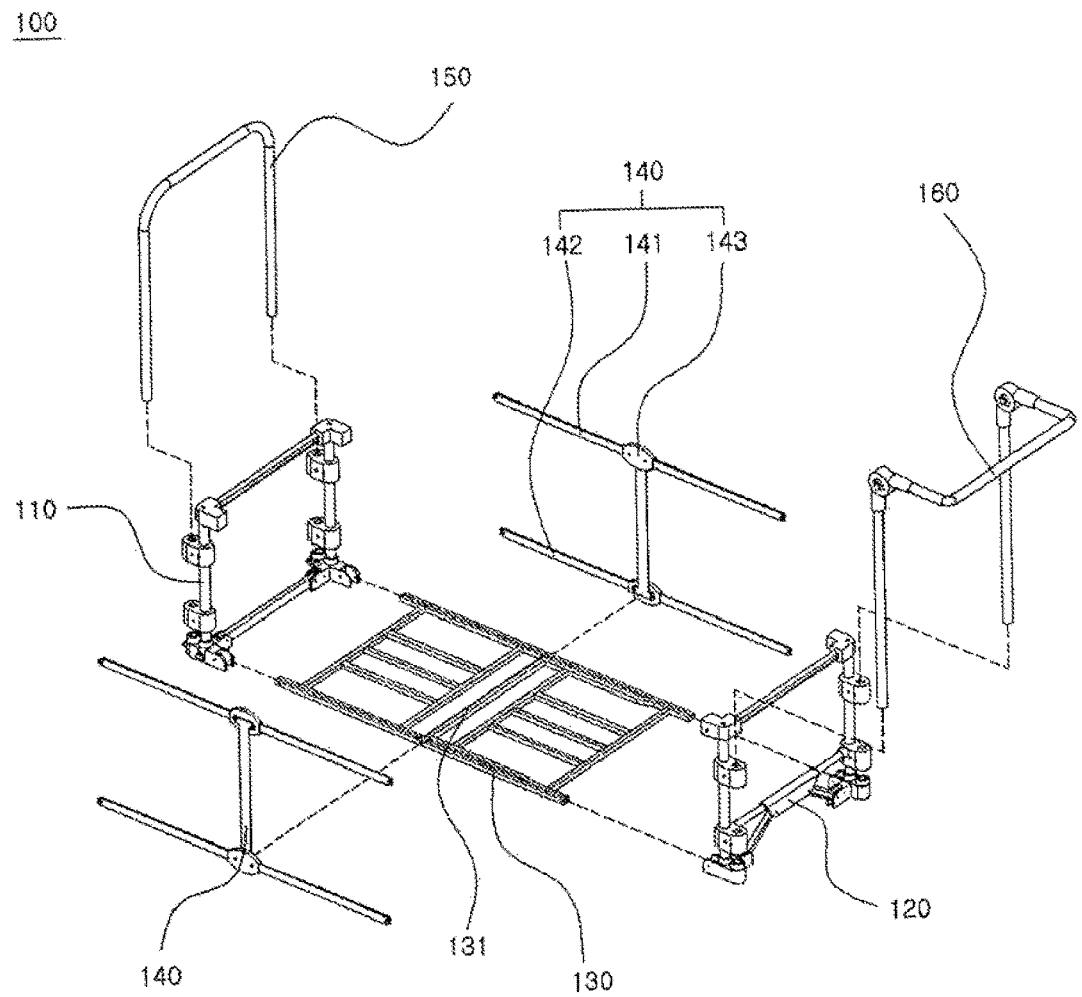
FIG. 5 is an exploded perspective view showing the structural elements of a foldable main body frame according to the present invention.

The front frame 110 is a '□'-shaped (square-like) frame provided at the front end of the foldable main body frame so as to stand up straight. The front frame 110 supports the front of the foldable main body frame. As shown in FIG. 3, the front frame 110 includes upper end two-axis support fixing members 111, lower end three-axis support fixing members 112, handle fixing clips 113, and canopy fixing poles 114.

Each of the upper end two-axis support fixing members 111 is formed in a shape. The upper end two-axis support fixing members 111 are fixedly coupled to the left and right upper ends of the front frame, which is formed at the front of the foldable main body frame, in a symmetrical fashion. Each of the upper end two-axis support fixing members 111 is provided in one side of the middle of the upper end thereof with a pole coupling fixing hole. The upper end two-axis support fixing members 111 are axially coupled to the front ends of upper side frames 141 in order to support the turning of the upper side frames 141.

Each of the upper end two-axis support fixing members 111 according to the present invention selectively includes one of a first upper end two-axis support fixing member 111a or a second upper end two-axis support fixing member 111b, depending on the structure of each of the canopy fixing poles coupled thereto.

The first upper end two-axis support fixing member 111a is provided in one side of the middle of the upper end thereof with a pole coupling fixing hole 111a-1, which has a screw thread formed in the inner upper end circumferential surface thereof, in order to fix a first canopy pole 114a, which has screw threads formed in the upper end and the lower end thereof.

In addition, the first canopy pole 114a extends downwards through the pole coupling fixing hole 111a-1 in the first upper end two-axis support fixing member 111a so as to be inserted into the front frame 110. The first upper end two-axis support fixing member 111a supports a pole protrusion fixing screw thread 114a-1 formed in the upper end of the first canopy pole 114a and a pole insertion fixing screw thread 114a-2 formed in the lower end of the first canopy pole 114a through the engagement with the screw thread formed in the inner upper end circumferential surface of the pole coupling fixing hole.

When the canopy unit 400 is installed, the pole insertion fixing screw threads 114a-2 formed in the lower ends of the canopy poles are engaged into the pole coupling fixing holes 111a-1 in the state in which the canopy poles, which are located in the front frame, stand up straight at the upper end of the front frame. When the canopy unit 400 is removed, the canopy poles are inserted into the front frame, and then the pole protrusion fixing screw threads 114*a*-1 formed in the upper ends of the canopy poles are engaged into the pole coupling fixing holes 111*a*-1.

Thus, when the infant wagon is stored or carried in the folded state, the first canopy pole 114*a* is fixed, and it is possible to prevent separation or loss of the first canopy pole 114*a* and to prevent damage to the frame and injury of a user due to the dropping of the first canopy pole 114*a*.

The second upper end two-axis support fixing member 111*b* is provided at one side of the outer surface thereof with a pole coupling switch 111*b*-2, and is provided in one side of the upper end thereof with a pole coupling fixing hole 111*b*-1, which is connected to the inside of the pole coupling switch, in order to fix a second canopy pole 114*b*, which has fixing recesses formed in the upper end and the lower end thereof.

In addition, the second canopy pole 114*b* extends downwards through the pole coupling fixing hole 111*b*-1 in the second upper end two-axis support fixing member 111*b* so as to be inserted into the front frame 110. The second upper end two-axis support fixing member 111*b* supports a pole upper end fixing recess 114*b*-1 formed in the upper end of the second canopy pole 114*b* and a pole lower end fixing recess 114*b*-2 formed in the lower end of the second canopy pole 114*b* through coupling with the pole coupling switch 111*b*-2 provided at one side of the outer surface of the pole coupling fixing hole.

When the canopy unit 400 is installed, the pole coupling switch 111*b*-2 is pushed and the inside of the pole coupling switch 111*b*-2 is fitted into the pole lower end fixing recess 114*b*-2 formed in the lower end of the second canopy pole in the state in which the second canopy pole, which is located in the front frame, stand up straight at the upper end of the front frame. When the canopy unit 400 is removed, the second canopy pole is inserted into the front frame, and then the inside of the pole coupling switch 111*b*-2 is fitted into the pole upper end fixing recess 114*b*-1.

Thus, when the infant wagon is stored or carried in the folded state, the second canopy pole 114*b* is fixed, and it is possible to prevent separation or loss of the second canopy pole 114*b* and to prevent damage to the frame and injury of a user due to the dropping of the second canopy pole 114*b*.

Each of the lower end three-axis support fixing members 112 is formed in a '¬' shape. The lower end three-axis support fixing members 112 are fixedly coupled to the left and right lower ends of the front frame in a symmetrical fashion. The lower end three-axis support fixing members 112 are axially coupled to the front ends of lower side frames 142 in order to support the turning of the lower side frames 142.

The lower end three-axis support fixing members 112 according to the present invention are formed at the left and right lower ends of the foldable main body frame in a symmetrical fashion to support the frames in three axial directions. The lower end three-axis support fixing members 112 support the front frame in the upward direction and the inward direction, support the lower end of the front handle frame at the front of the upper end thereof, and support the fronts of the lower side frames 142 in the rearward direction.

Each of the lower end three-axis support fixing members 112 includes a front wheel rotation fixing switch 112*a* and a front wheel detachment switch 112*b*.

The front wheel rotation fixing switch 112*a* is a switch located at the front of a corresponding lower end three-axis support fixing member so as to move in the upward-downward direction. When the front wheel rotation fixing switch 112*a* moves in the upward-downward direction, a rotation fixing pin 112*a*-1 connected to the inside lower end of the lower end three-axis support fixing member moves in the upward-downward direction. The rotation fixing pin 112*a*-1 is inserted into or separated from a rotation fixing pin insertion recess 211*a*, which is aligned with the rotation fixing pin 112*a*-1 in the vertical direction, to prevent the 360-degree rotation of a front wheel drive unit 210 in the horizontal direction.

When the front wheel rotation fixing switch 112*a* is moved in the upward direction, the rotation fixing pin 112*a*-1, connected to the inside lower end of the lower end three-axis support fixing member, moves upwards in the vertical direction, whereby the rotation fixing pin 112*a*-1 is separated from the rotation fixing pin insertion recess 211*a*. As a result, the mode of the infant wagon is set to a direction changing mode, in which the front wheel drive unit 210 is rotatable 360 degrees about a front wheel coupling pin 211*b* in the horizontal direction. When the front wheel rotation fixing switch 112*a* is moved in the downward direction, the rotation fixing pin 112*a*-1, connected to the inside lower end of the lower end three-axis support fixing member, moves downwards in the vertical direction, whereby the rotation fixing pin 112*a*-1 is coupled into the rotation fixing pin insertion recess 211*a*. As a result, the mode of the infant wagon is set to a straight movement mode, in which the rotation of the front wheel drive unit 210 in the horizontal direction is prevented.

Thus, the direction changing mode and the straight movement mode may be determined according to the selection of a caregiver.

In the direction changing mode, front wheels are rotatable 360 degrees in the horizontal direction, rather than being fixed in a specific direction, whereby the direction of the infant wagon is smoothly changed. In addition, the force necessary to change the direction of the infant wagon is reduced, whereby the fatigue of the caregiver is reduced.

In the straight movement mode, the front wheels are fixed so as to face in the forward direction such that the front wheels cannot rotate in the horizontal direction but can move only straight ahead. When the infant wagon is moved straight ahead, therefore, the infant wagon may be uniformly moved by pushing force without strong manipulation of the handle, whereby the fatigue of the caregiver may be reduced.

The front wheel detachment switch 112*b* is a switch located at one side of the outer surface of a corresponding lower end three-axis support fixing member so as to move in the upward-downward direction. According to the adjustment thereof in the upward-downward direction, the front wheel detachment switch 112*b* is coupled into or separated from a coupling pin recess 211*b*-1 formed in the front wheel coupling pin 211*b*, which is inserted into a front wheel detachment pin insertion recess 112*b*-1, in order to couple the front wheel drive unit 210 to the front frame or in order to separate the front wheel drive unit 210 from the front frame.

When the front wheel detachment switch 112*b* is moved in the upward direction, the front wheel detachment switch 112*b* is separated from the coupling pin recess 211*b*-1, to which the same has been coupled in the inward direction, whereby the front wheel drive unit 210 is separated from the front frame. When the front wheel detachment switch 112*b* is moved in the downward direction, the front wheel detachment switch 112*b* is coupled into the coupling pin recess 211*b*-1 in the inward direction, whereby the front wheel drive unit 210 is coupled to the lower end of the front frame.

In this way, the separation of the front wheel drive unit 210 is possible, whereby it is possible to minimize the volume of the infant wagon and to easily carry and store the infant wagon. In addition, when the front wheels are worn or damaged, it is possible to replace only the front wheels, whereby it is possible to easily maintain and repair the infant wagon.

The handle fixing clips 113 serve to fix the lower ends of the front handle frame 150 and the rear handle frame 160 and the lower ends of the front frame 110 while surrounding the lower ends of the front handle frame 150 and the rear handle frame 160 and the lower ends of the front frame 110. The handle fixing clips securely couple the front handle frame to the front frame such that, when the caregiver pushes or pulls the infant wagon or changes the direction of the infant wagon while holding the front handle frame, the loss of force is minimized, whereby it is possible for the caregiver to easily control the infant wagon even when the caregiver moves the infant wagon alone, and therefore it is possible to reduce the unnecessary exertion of physical strength of the caregiver.

The handle fixing clips 113 according to the present invention are coupled to the left and right upper ends and the left and right lower ends of the front frame 110.

Each of the handle fixing clips 113, which are formed at the left and right sides of the upper end of the front of the foldable main body frame in order to couple the front handle frame 150 to the front frame 110, is provided in the inner side thereof with a guide rail 113b for moving a basket frame 115 to change the fixing angle of the basket frame 115, a long fixing pin insertion hole 113a, and a basket frame support bar 113c.

Figure 6:
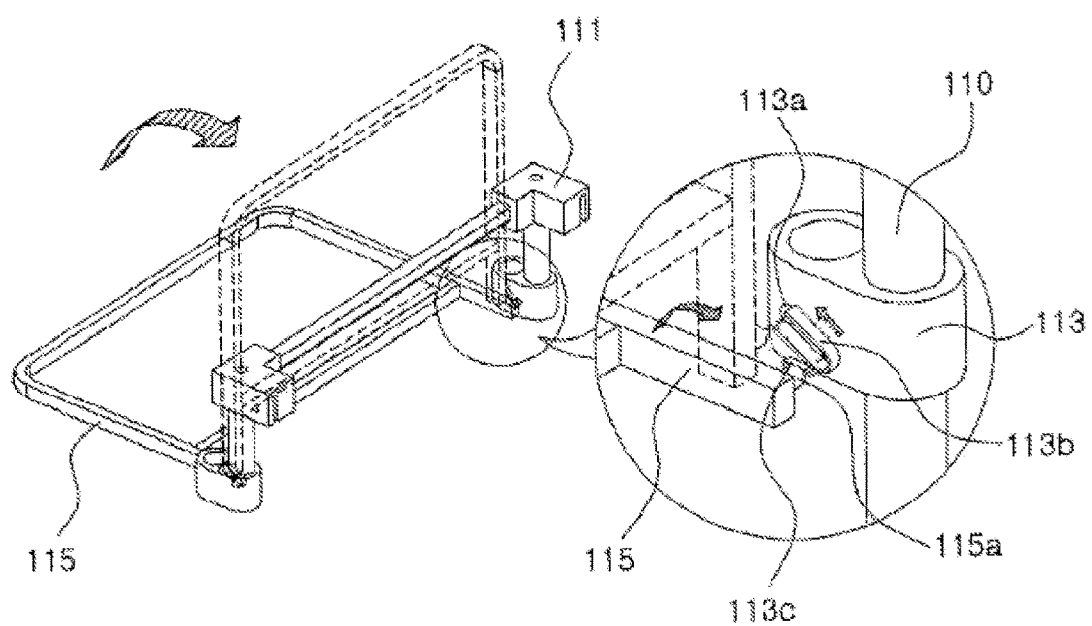
FIG. 6 is a view showing an embodiment in which a basket using mode is changed to a basket folding mode through the rotation of a basket coupling frame fixed in an upper end two-axis support fixing member according to the present invention, with an enlarged view showing the state in which the basket coupling frame is installed depending on the movement of a basket fixing pin.
Figure 7:
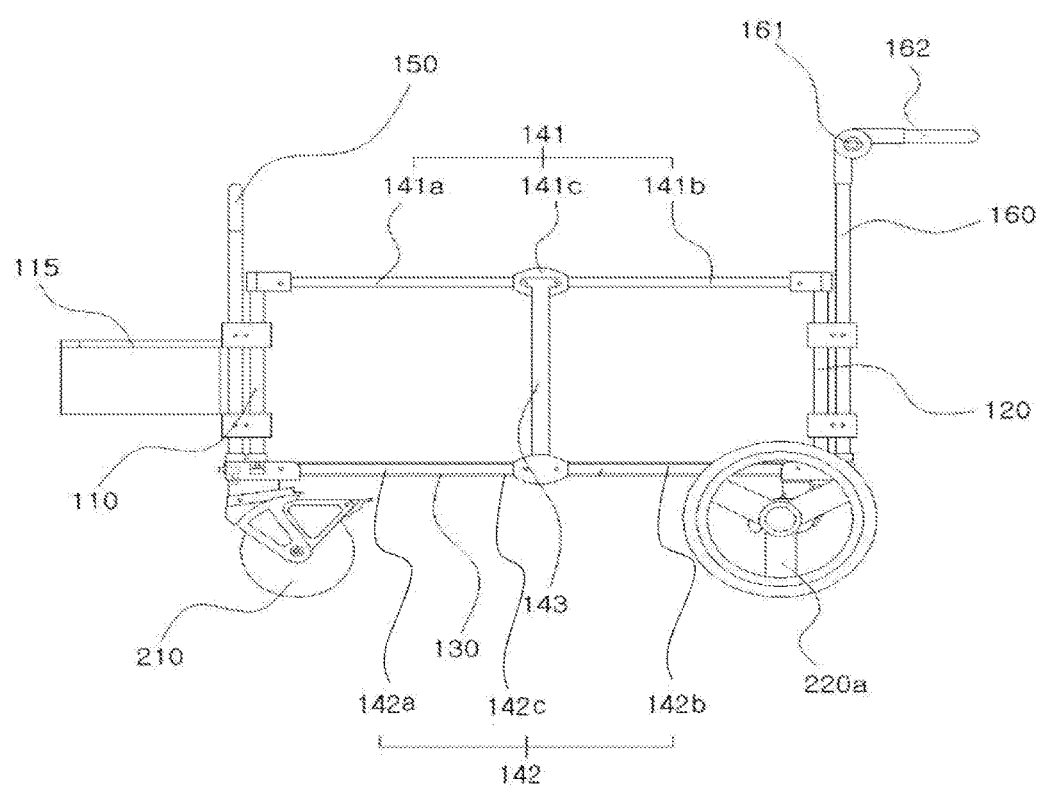
FIG. 7 is a side view showing the foldable main body frame according to the present invention and a wagon wheel unit, to which a first rear wheel drive unit is selectively coupled.
Figure 8:
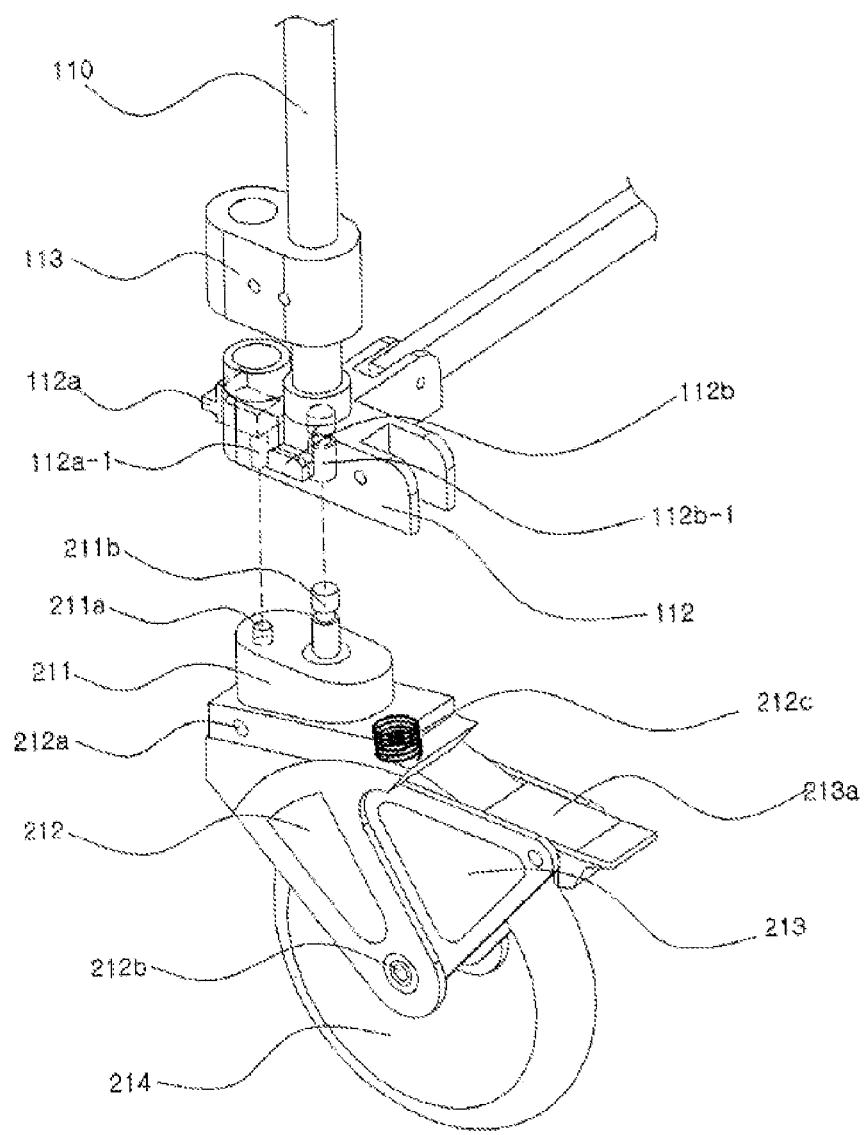
FIG. 8 is a perspective view showing the structural elements of a front wheel drive unit, which is coupled to the lower end of the front frame according to the present invention.
Figure 9:
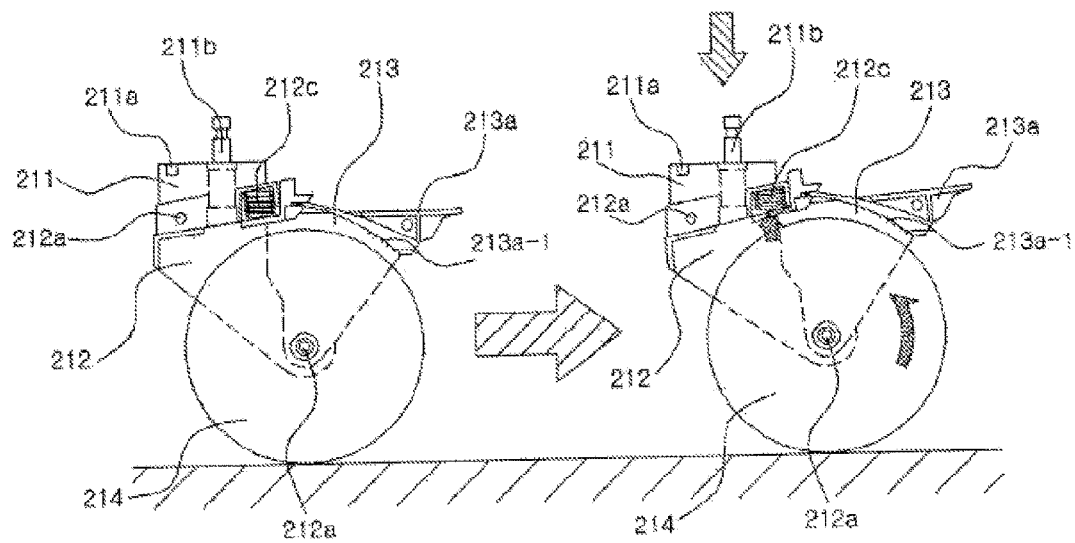
FIG. 9 is a side view showing an embodiment in which a front wheel elastic spring is compressed while a front wheel, coupled to a front wheel rotating shaft, is rotated in the counterclockwise direction with respect to a front wheel fixing shaft when a load is applied to the front wheel drive unit according to the present invention.
Figure 10:
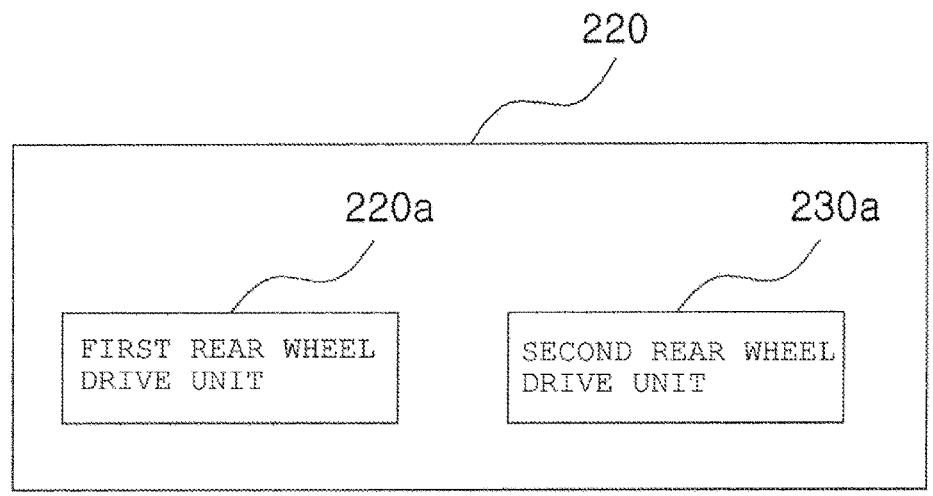
FIG. 10 is a block diagram showing a rear wheel drive unit including a first rear wheel drive unit and a second rear wheel drive unit according to the present invention.
Figure 11:
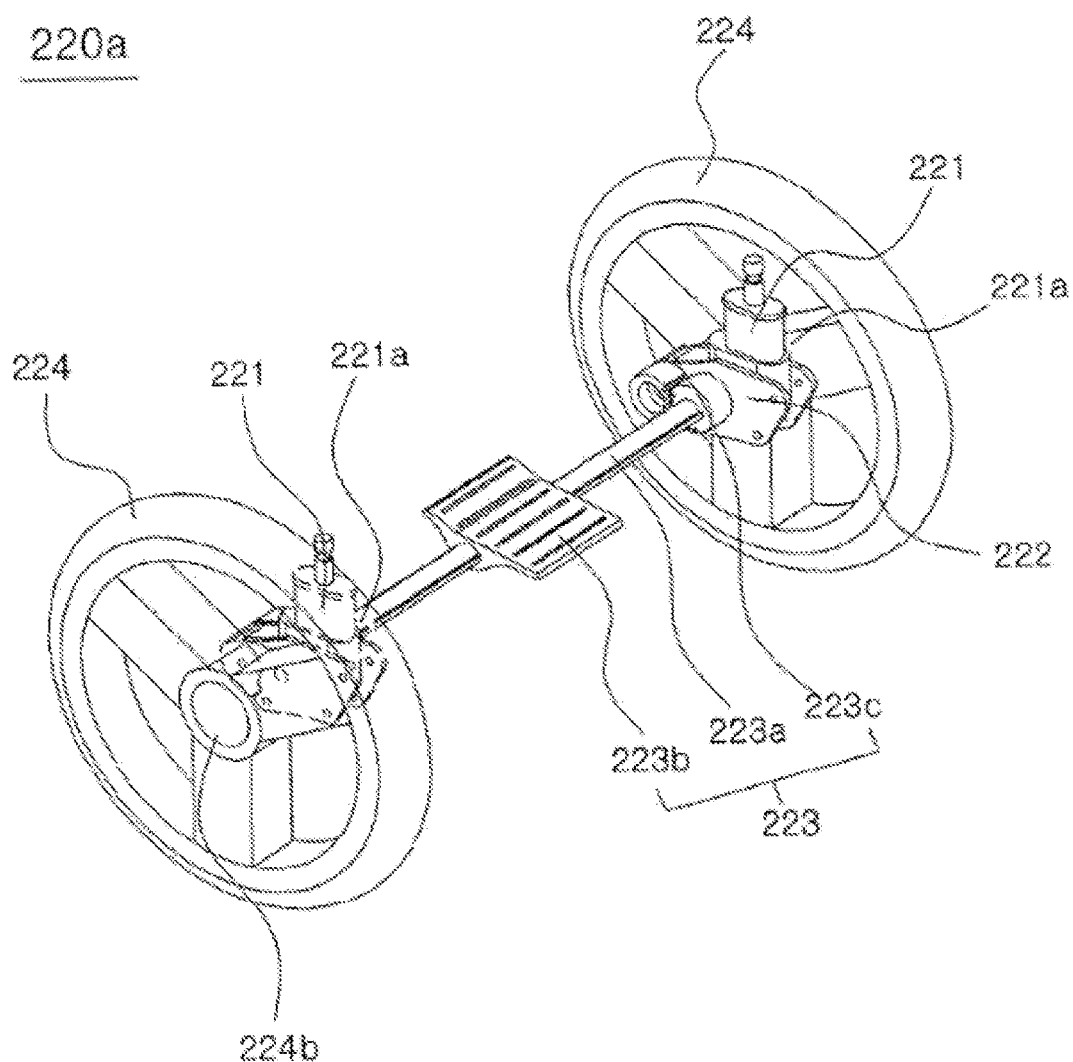
FIG. 11 is a perspective view showing the structural elements of the first rear wheel drive unit according to the present invention.
Figure 12:
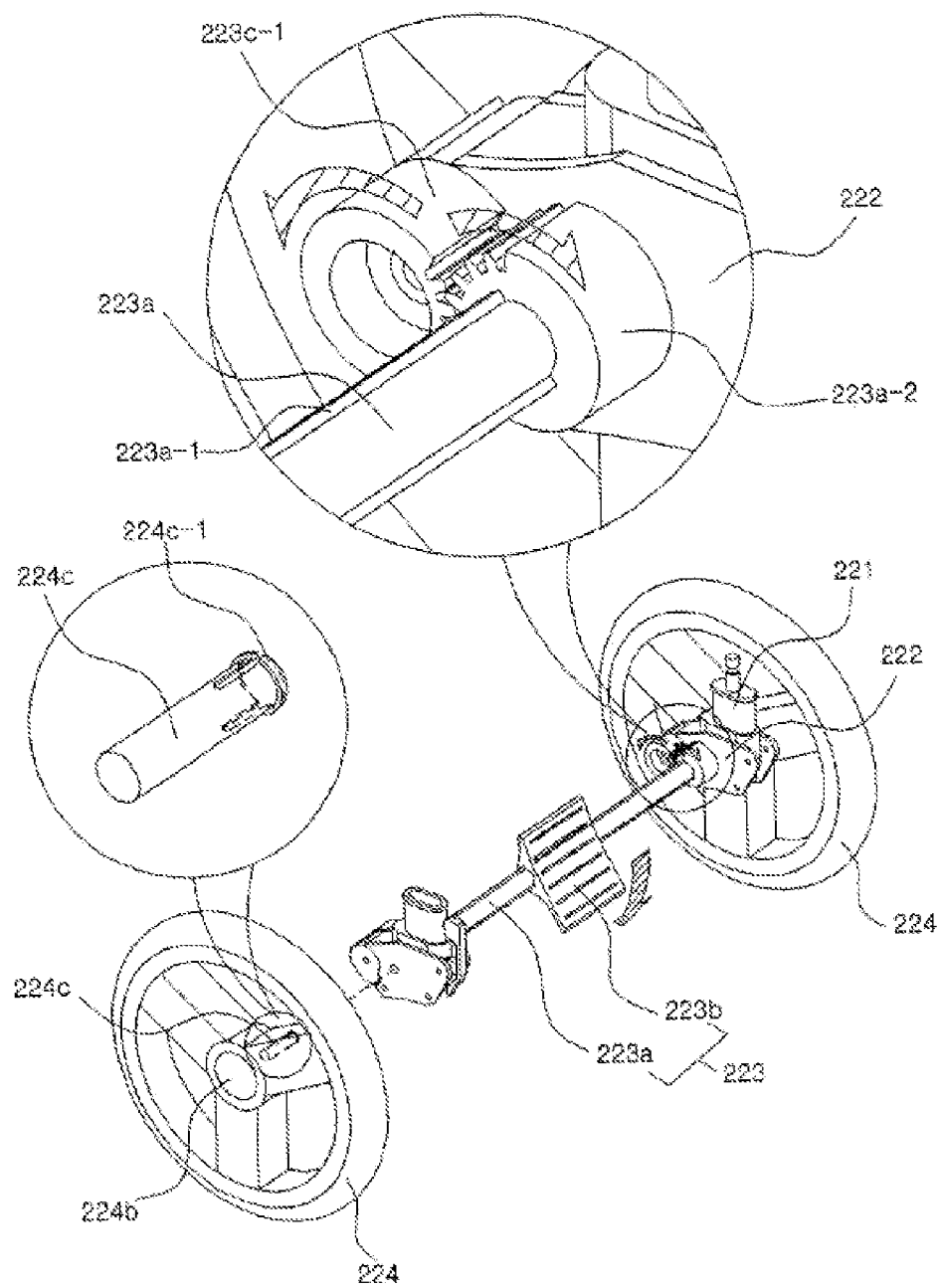
FIG. 12 is a view showing that the rear surface of a brake pad of the first rear wheel drive unit according to the present invention is rotated downwards by stepping on the rear surface of the brake pad, with an enlarged view showing the state in which a first gear is rotated in the clockwise direction and a second gear, which is engaged with the first gear, is rotated in the counterclockwise direction.
Figure 13:
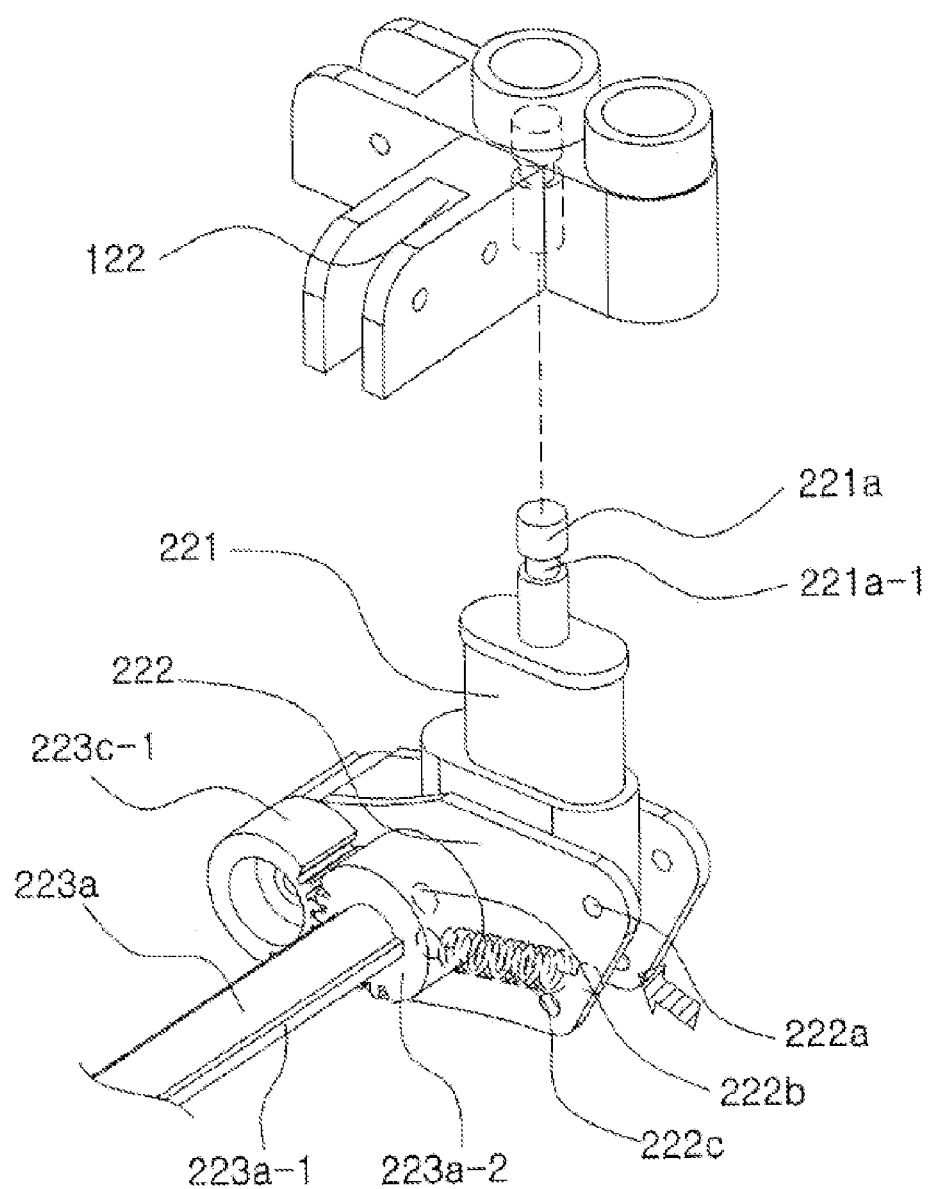
FIG. 13 is a view showing the structural elements of the first rear wheel drive unit, which is coupled to the lower end of the rear frame according to the present invention, and showing an embodiment in which a rear wheel detachment pin is separated from an inner through hole and an outer through hole by pushing the lower end of a rear wheel detachment grip.
Figure 14:
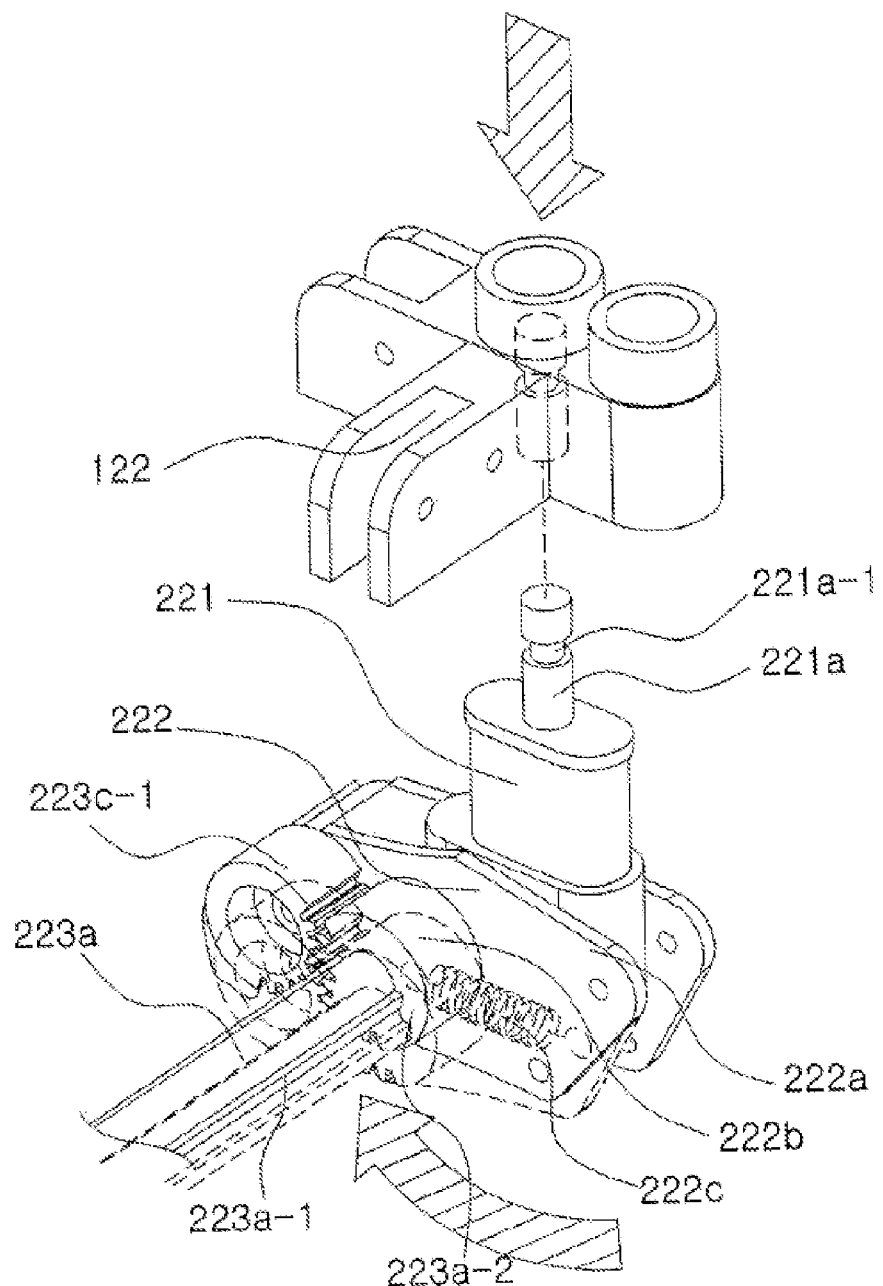
FIG. 14 is a view showing an embodiment in which a rear wheel shock absorption frame is rotated in the counterclockwise direction with respect to a rear wheel fixing shaft in order to absorb shocks when a load is applied to the first rear wheel drive unit according to the present invention.

As shown in FIG. 6, each of the handle fixing clips 113 is used in a basket using mode, in which a basket fixing pin 115a is inserted into the long fixing pin insertion hole in the rear end of the guide rail of each of the handle fixing clips 113 in the diagonal direction such that the basket frame 115 lays down so as to be perpendicular to the front frame, whereby the side surface of the basket frame is supported by the basket frame support bar 113c, and in a basket folding mode, in which the basket fixing pin 115a is inserted into the long fixing pin insertion hole in the front end of the guide rail such that the basket frame 115 stands up straight so as to be parallel to the front frame.

Each of the canopy fixing poles 114 is formed in a circular rod shape having identical circular ends protruding from the upper end and the lower end thereof. Each of the canopy fixing poles 114 is coupled to the pole coupling fixing hole in the upper end two-axis support fixing member in order to support the canopy unit 400 connected to the upper end of the upper end two-axis support fixing member.

Each of the canopy fixing poles 114 according to the present invention selectively includes one of a first canopy pole 114a or a second canopy pole 114b, depending on the structure of the upper end two-axis support fixing member to which each of the canopy fixing poles 114 is coupled.

The first canopy pole 114a is formed in a circular rod shape having identical screw threads formed in the upper end and the lower end thereof. The first canopy pole 114a is provided in the upper end thereof with a pole protrusion fixing screw thread 114a-1, and is provided in the lower end thereof with a pole insertion fixing screw thread 114a-2.

The first canopy pole 114a is inserted vertically into the pole coupling fixing hole 111a-1, which is formed in one side of the upper end of the first upper end two-axis support fixing member 111a and which has a screw thread formed in the inner upper end thereof. Depending on whether or not the canopy unit 400 is used, one of the pole protrusion fixing screw thread 114a-1, which is formed in the upper end of the first canopy pole 114a, and the pole insertion fixing screw thread 114a-2, which is formed in the lower end of the first canopy pole 114a, is engaged with the screw thread formed in the pole coupling fixing hole 111a-1.

When the canopy unit is installed, the pole insertion fixing screw thread 114a-2, which is formed in the lower end of the first canopy pole 114a, is fixed in the pole coupling fixing hole 111a-1, which is formed in the upper end of the first upper end two-axis support fixing member 111a. In the canopy separating and folding mode, the pole protrusion fixing screw thread 114a-1, which is formed in the upper end of the first canopy pole 114a, is fixed in the pole coupling fixing hole 111a-1, which is formed in the upper end of the first upper end two-axis support fixing member 111a.

Consequently, the first canopy poles 114a are stably fixed in the canopy separating and folding mode, in which the first canopy poles 114a are inserted into the front frame 110 from above the front frame 110, as well as in the state in which the canopy unit is installed, i.e. in the state in which the first canopy poles 114a stand up straight. Thus, it is possible to prevent damage to the first canopy poles, such as bending of the first canopy poles, due to protrusion of the first canopy poles, to prevent a safety-related accident involving a user, and to prevent the loss of the first canopy poles due to separation of the first canopy poles when the infant wagon is moved.

The second canopy pole 114b is formed in a circular rod shape having identical switch recesses formed in the upper end and the lower end thereof. The second canopy pole 114b is provided in the upper end thereof with a pole upper end fixing recess 114b-1, and is provided in the lower end thereof with a pole lower end fixing recess 114b-2.

The second upper end two-axis support fixing member 111b is provided at one side of the outer surface thereof with a pole coupling switch 111b-2. Depending on whether or not the canopy unit 400 is used, one of the pole upper end fixing recess 114b-1, which is formed in the upper end of the second canopy pole 114b, and the pole lower end fixing recess 114b-2, which is formed in the lower end of the second canopy pole 114b, is fixed to the pole coupling fixing hole 111b-1, which is provided in one side of the upper end of the second upper end two-axis support fixing member 111b and which is connected to the inside of the pole coupling switch.

When the canopy unit is installed, the pole lower end fixing recess 114b-2 is fixed in the pole coupling switch 111b-2, which is formed at one side of the outer surface of the second upper end two-axis support fixing member 111b. In the canopy separating and folding mode, the pole upper end fixing recess 114b-1, which is formed in the upper end of the second canopy pole 114b, is fixed in the pole coupling switch 111b-2, which is formed at one side of the outer surface of the second upper end two-axis support fixing member 111b.

Consequently, the second canopy poles 114b are stably fixed in the canopy separating and folding mode, in which the second canopy poles 114b are inserted into the front frame 110 from above the front frame 110, as well as in the state in which the canopy unit is installed, i.e. in the state in which the second canopy poles 114b stand up straight. Thus, it is possible to prevent damage to the second canopy poles, such as bending of the second canopy poles, due to protrusion of the second canopy poles, to prevent a safety-related accident involving a user, and to prevent the loss of the second canopy poles due to separation of the second canopy poles when the infant wagon is moved.

Second, the rear frame 120 according to the present invention will be described.

The rear frame 120 is a '⌑'-shaped frame provided at the rear end of the foldable main body frame so as to stand up straight, and is configured such that a lower end frame part of the rear frame 120 is bent upwards so as to have a recess, thereby having a trapezoidal shape. The rear frame 120 supports the rear of the foldable main body frame. As shown in FIG. 3, the rear frame 120 includes upper end two-axis support fixing members 121, lower end three-axis support fixing members 122, handle fixing clips 123, and canopy fixing poles 124.

The lower end frame part of the rear frame 120 is bent upwards so as to have a trapezoidal shape. Consequently, the distance between a brake pad 213*a*, formed inside the lower end of the rear of the foldable main body frame, and the rear frame 120 is increased, whereby it is possible to easily step on the brake pad. In addition, it is possible to prevent a kickback phenomenon in which the foot of the caregiver, which steps forward when the caregiver walks, collides with the lower end of the rear frame, thereby enabling the caregiver to walk comfortably and improving the riding comfort of the infant.

Each of the upper end two-axis support fixing members 121 is formed in a '¬' shape. The upper end two-axis support fixing members 121 are fixedly coupled to the left and right upper ends of the rear frame, which is formed at the rear of the foldable main body frame, in a symmetrical fashion. Each of the upper end two-axis support fixing members 121 is provided in one side of the middle of the upper end thereof with a pole coupling fixing hole 121*a* having a screw thread formed in the inner surface thereof. The upper end two-axis support fixing members 121 are axially coupled to the rear ends of the upper side frames 141 in order to support the turning of the upper side frames 141.

In addition, each of the upper end two-axis support fixing members 121 selectively includes one of a first upper end two-axis support fixing member 121*a* or a second upper end two-axis support fixing member 121*b*, depending on the structure of each of the canopy fixing poles coupled thereto.

The first upper end two-axis support fixing member 121*a* is provided in one side of the middle of the upper end thereof with a pole coupling fixing hole 121*a*-1, which has a screw thread formed in the inner upper end circumferential surface thereof, in order to fix a first canopy pole 124*a*, which has screw threads formed in the upper end and the lower end thereof.

In addition, the first canopy pole 124*a* extends downwards through the pole coupling fixing hole 121*a*-1 in the first upper end two-axis support fixing member 121*a* so as to be inserted into the rear frame 120. The first upper end two-axis support fixing member 121*a* supports a pole protrusion fixing screw thread 124*a*-1 formed in the upper end of the first canopy pole 124*a* and a pole insertion fixing screw thread 124*a*-2 formed in the lower end of the first canopy pole 124*a* through engagement with the screw thread formed in the inner upper end circumferential surface of the pole coupling fixing hole.

When the canopy unit 400 is installed, the pole insertion fixing screw threads 124*a*-2 formed in the lower ends of the canopy poles are engaged into the pole coupling fixing holes 121*a*-1 in the state in which the canopy poles, which are located in the rear frame, stand up straight at the upper end of the rear frame. When the canopy unit 400 is removed, the canopy poles are inserted into the rear frame, and then the pole protrusion fixing screw threads 124*a*-1 formed in the upper ends of the canopy poles are engaged into the pole coupling fixing holes 121*a*-1.

Thus, when the infant wagon is stored or carried in the folded state, the first canopy pole 124*a* is fixed, and it is possible to prevent separation or loss of the first canopy pole 124*a* and to prevent damage to the frame and injury of a user due to the dropping of the first canopy pole 124*a*.

The second upper end two-axis support fixing member 121*b* is provided at one side of the outer surface thereof with a pole coupling switch 121*b*-2, and is provided in one side of the upper end thereof with a pole coupling fixing hole 121*b*-1, which is connected to the inside of the pole coupling switch 121*b*-2, in order to fix a second canopy pole 124*b*, which has fixing recesses formed in the upper end and the lower end thereof.

In addition, the second canopy pole 124*b* extends downwards through the pole coupling fixing hole 121*b*-1 in the second upper end two-axis support fixing member 121*b* so as to be inserted into the rear frame 120. The second upper end two-axis support fixing member 121*b* supports a pole upper end fixing recess 124*b*-1 formed in the upper end of the second canopy pole 124*b* and a pole lower end fixing recess 124*b*-2 formed in the lower end of the second canopy pole 124*b* through coupling with the pole coupling switch 121*b*-2 provided at one side of the outer surface of the pole coupling fixing hole.

When the canopy unit 400 is installed, the pole coupling switch 121*b*-2 is pushed and the inside of the pole coupling switch 121*b*-2 is fitted into the pole lower end fixing recess 124*b*-2 formed in the lower end of the second canopy pole in the state in which the second canopy pole, which is located in the rear frame, stand up straight at the upper end of the rear frame. When the canopy unit 400 is removed, the second canopy pole is inserted into the rear frame, and then the inside of the pole coupling switch 121*b*-2 is fitted into the pole upper end fixing recess 124*b*-1, which is formed in the upper end of the second canopy pole.

Thus, when the infant wagon is stored or carried in the folded state, the second canopy pole 124*b* is fixed, and it is possible to prevent separation or loss of the second canopy pole 124*b* and to prevent damage to the frame and injury of a user due to the dropping of the second canopy pole 124*b*.

Each of the lower end three-axis support fixing members 122 is formed in a '¬' shape. The lower end three-axis support fixing members 122 are fixedly coupled to the left and right lower ends of the rear frame in a symmetrical fashion. The lower end three-axis support fixing members 122 are axially coupled to the rear ends of lower side frames 142 in order to support the turning of the lower side frames 142. Each of the lower end three-axis support fixing members 122 includes a rear wheel detachment switch 122*a*.

The rear wheel detachment switch 122*a* is a switch located at one side of the outer surface of a corresponding lower end three-axis support fixing member so as to move in the upward-downward direction. According to the adjustment thereof in the upward-downward direction, the rear wheel detachment switch 122*a* is coupled into or separated from a coupling pin recess 221*a*-1 formed in a rear wheel coupling pin 221*a*, which is inserted into a rear wheel detachment pin insertion recess 122*a*-1, in order to couple the rear wheel drive unit 220 to the rear frame or in order to separate the rear wheel drive unit 220 from the rear frame.

When the rear wheel detachment switch 122*a* is moved in the upward direction, the rear wheel detachment switch 122*a* is separated from the coupling pin recess 221*a*-1 coupled in the inward direction, whereby the rear wheel drive unit 220 is separated from the rear frame. When the rear wheel detachment switch 122a is moved in the downward direction, the rear wheel detachment switch 122a is coupled into the coupling pin recess 221a-1 in the inward direction, whereby the rear wheel drive unit 220 is coupled to the lower end of the rear frame.

In this way, separation of the rear wheel drive unit 220 is possible, whereby it is possible to minimize the volume of the infant wagon and to easily carry and store the infant wagon. In addition, when the rear wheels are worn or damaged, it is possible to replace only the rear wheels, whereby it is possible to easily maintain and repair the infant wagon.

The handle fixing clips 123 serve to fix the lower ends of the rear handle frame 160 and the lower ends of the rear frame 120 while surrounding the lower ends of the rear handle frame 160 and the lower ends of the rear frame 120. The handle fixing clips 123 securely couple the rear handle frame to the rear frame such that, when the caregiver pushes or pulls the infant wagon or changes the direction of the infant wagon while holding the rear handle frame, the loss of force is minimized, whereby it is possible for the caregiver to easily control the infant wagon even when the caregiver moves the infant wagon alone, and therefore it is possible to reduce the unnecessary exertion of physical strength of the caregiver.

The handle fixing clips 123 according to the present invention are coupled to the left and right upper ends and the left and right lower ends of the rear frame 120.

Each of the canopy fixing poles 124 is formed in a circular rod shape having identical circular ends protruding from the upper end and the lower end thereof. Each of the canopy fixing poles 124 is coupled to the pole coupling fixing hole in the upper end two-axis support fixing member in order to support the canopy unit 400 connected to the upper end of the upper end two-axis support fixing member.

Each of the canopy fixing poles 124 according to the present invention selectively includes one of a first canopy pole 124a or a second canopy pole 124b, depending on the structure of the upper end two-axis support fixing member to which each of the canopy fixing poles 124 is coupled.

The first canopy pole 124a is formed in a circular rod shape having identical screw threads formed in the upper end and the lower end thereof. The first canopy pole 124a is provided in the upper end thereof with a pole protrusion fixing screw thread 124a-1, and is provided in the lower end thereof with a pole insertion fixing screw thread 124a-2.

The first canopy pole 124a is inserted vertically into the pole coupling fixing hole 121a-1, which is formed in one side of the upper end of the first upper end two-axis support fixing member 121a and which has a screw thread formed in the inner upper end thereof. Depending on whether or not the canopy unit 400 is used, one of the pole protrusion fixing screw thread 124a-1, which is formed in the upper end of the first canopy pole 124a, and the pole insertion fixing screw thread 124a-2, which is formed in the lower end of the first canopy pole 124a, is engaged with the screw thread formed in the pole coupling fixing hole 121a-1.

When the canopy unit is installed, the pole insertion fixing screw thread 124a-2, which is formed in the lower end of the first canopy pole 124a, is fixed in the pole coupling fixing hole 121a-1, which is formed in the upper end of the first upper end two-axis support fixing member 121a. In the canopy separating and folding mode, the pole protrusion fixing screw thread 124a-1, which is formed in the upper end of the first canopy pole 124a, is fixed in the pole coupling fixing hole 121a-1, which is formed in the upper end of the first upper end two-axis support fixing member 121a.

Consequently, the first canopy poles 124a are stably fixed in the canopy separating and folding mode, in which the first canopy poles 124a are inserted into the rear frame 120 from above the rear frame 120, as well as in the state in which the canopy unit is installed, i.e. in the state in which the first canopy poles 124a stand up straight. Thus, it is possible to prevent damage to the first canopy poles 124a, such as bending of the first canopy poles 124a, due to protrusion of the first canopy poles 124a, to prevent a safety-related accident involving a user, and to prevent the loss of the first canopy poles 124a due to separation of the first canopy poles 124a when the infant wagon is moved.

The second canopy pole 124b is formed in a circular rod shape having identical switch recesses formed in the upper end and the lower end thereof. The second canopy pole 124b is provided in the upper end thereof with a pole upper end fixing recess 124b-1, and is provided in the lower end thereof with a pole lower end fixing recess 124b-2.

The second upper end two-axis support fixing member 121b is provided at one side of the outer surface thereof with a pole coupling switch 121b-2. Depending on whether or not the canopy unit 400 is used, one of the pole upper end fixing recess 124b-1, which is formed in the upper end of the second canopy pole 124b, and the pole lower end fixing recess 124b-2, which is formed in the lower end of the second canopy pole 124b, is fixed to the pole coupling fixing hole 121b-1, which is provided in one side of the upper end of the second upper end two-axis support fixing member 121b and which is connected to the inside of the pole coupling switch.

When the canopy unit is installed, the pole lower end fixing recess 124b-2 is fixed in the pole coupling switch 121b-2, which is formed at one side of the outer surface of the second upper end two-axis support fixing member 121b. In the canopy separating and folding mode, the pole upper end fixing recess 124b-1, which is formed in the upper end of the second canopy pole 124b, is fixed in the pole coupling switch 121b-2, which is formed at one side of the outer surface of the second upper end two-axis support fixing member 121b.

Consequently, the second canopy poles 124b are stably fixed in the canopy separating and folding mode, in which the second canopy poles 124b are inserted into the rear frame 120 from above the rear frame 120, as well as in the state in which the canopy unit is installed, i.e. in the state in which the second canopy poles 124b stand up straight. Thus, it is possible to prevent damage to the second canopy poles 124b, such as bending of the second canopy poles 124b, due to protrusion of the second canopy poles 124b, to prevent a safety-related accident involving a user, and to prevent the loss of the second canopy poles 124b due to separation of the second canopy poles 124b when the infant wagon is moved.

Third, the support frame 130 according to the present invention will be described.

The support frame 130 is a rectangular frame coupled to the inside lower ends of the front frame and the rear frame. The support frame 130 is provided at the middle thereof with respect to the forward-rearward direction with a wagon middle shaft 131. A front support frame and a rear support frame of the support frame 130 are folded or unfolded in a symmetrical fashion to vary the shape of the support frame 130 according to the upward and downward movement of the wagon middle shaft 131.

In the wagon using mode, in which the infant wagon is used, the front and rear support frames are arranged parallel to the wagon middle shaft to provide a space in which the seat unit 300 can be unfolded. In the wagon folding mode, the front and rear support frames are folded in a 'V' shape in a symmetrical fashion with respect to the wagon middle shaft, whereby the volume of the support frame 130 is reduced.

Fourth, the side frames 140 according to the present invention will be described.

Each of the side frames 140 is configured such that an upper side frame, which is formed horizontally, is axially coupled to the upper end of the front frame and to the upper end of the rear frame in a symmetrical fashion. A lower side frame, which is formed horizontally, is axially coupled to the lower end of the front frame and to the lower end of the rear frame in a symmetrical fashion. The upper end and the lower end of a vertical connection frame, which stands up straight, are axially coupled to the middle of the upper side frame and to the middle of the lower side frame, respectively.

Specifically, each of the side frames 140 includes an upper side frame 141, a lower side frame 142, and a vertical connection frame 143.

The upper side frame 141 is a symmetrical hinge type frame that constitutes the upper end of each of the side frames. The upper side frame 141 is axially coupled to the upper end of the front frame and to the upper end of the rear frame so as to turn in a symmetrical fashion. The upper side frame 141 includes a front upper side frame 141a, a rear upper side frame 141b, and an upper hinge 141c.

The front upper side frame 141a is a rectangular frame located in the forward direction. The front end of the front upper side frame 141a is axially coupled to the front frame 110, and the rear end of the front upper side frame 141a is axially coupled to the upper hinge 141c.

The rear upper side frame 141b is a rectangular frame located in the rearward direction. The front end of the rear upper side frame 141b is axially coupled to the upper hinge 141c, and the rear end of the rear upper side frame 141b is axially coupled to the rear frame 120.

The upper hinge 141c is a '◯'-shaped frame coupled to a rear turning shaft of the front upper side frame 141a and to a front turning shaft of the rear upper side frame 141b in a symmetrical fashion. The upper hinge 141c moves upwards and downwards in response to the turning of the front upper side frame and the rear upper side frame, to which the upper hinge 141c is coupled.

The lower side frame 142 is a symmetrical hinge type frame that constitutes the lower end of each of the side frames. The lower side frame 142 is axially coupled to the lower end of the front frame and to the lower end of the rear frame so as to turn in a symmetrical fashion. The lower side frame 142 includes a front lower side frame 142a, a rear lower side frame 142b, and a lower hinge 142c.

The front lower side frame 142a is a rectangular frame located in the forward direction. The front end of the front lower side frame 142a is axially coupled to the front frame 110, and the rear end of the front lower side frame 142a is axially coupled to the lower hinge 142c.

The rear lower side frame 142b is a rectangular frame located in the rearward direction. The front end of the rear lower side frame 142b is axially coupled to the lower hinge 142c, and the rear end of the rear lower side frame 142b is axially coupled to the rear frame 120.

The lower hinge 142c is a '◯'-shaped frame coupled to a rear turning shaft of the front lower side frame 142a and to a front turning shaft of the rear lower side frame 142b in a symmetrical fashion. The lower hinge 142c moves upwards and downwards in response to the turning of the front lower side frame and the rear lower side frame, to which the lower hinge 142c is coupled.

The vertical connection frame 143 is an 'I'-shaped frame that stands up in the vertical direction. The upper end of the vertical connection frame 143 is connected to the middle of the upper side frame, and the lower end of the vertical connection frame 143 is connected to the middle of the lower side frame in order to turn the upper side frame and the lower side frame by the same angle.

Specifically, the vertical connection frame 143 is coupled to two shafts of the upper hinge 141c, which is located at the middle of the upper side frame, and is coupled to two shafts of the lower hinge 142c, which is located at the middle of the lower side frame.

In the wagon using mode, the vertical connection frame supports the front upper side frame 141a and the rear upper side frame 141b, which constitute the upper end of each of the side frames, and the front lower side frame 142a and the rear lower side frame 142b, which constitute the lower end of each of the side frames, such that the front upper side frame 141a and the rear upper side frame 141b are maintained in the horizontal state in a symmetrical fashion and such that the front lower side frame 142a and the rear lower side frame 142b are maintained in the horizontal state in a symmetrical fashion. In the wagon folding mode, the upper hinge 141c and the lower hinge 142c move upwards in the state of being spaced apart from each other by the same distance such that the front upper side frame 141a and the rear upper side frame 141b stand up straight in the vertical direction, whereby the lower ends of the front upper side frame 141a and the rear upper side frame 141b are located so as to face each other in the horizontal direction, and such that the front lower side frame 142a and the rear lower side frame 142b stand up straight in the vertical direction, whereby the lower ends of the front lower side frame 142a and the rear lower side frame 142b are located so as to face each other in the horizontal direction.

Fifth, the front handle frame 150 according to the present invention will be described.

The front handle frame 150 is a '⊓'-shaped frame located in front of the front frame. The front handle frame 150 is coupled to left and right front portions of the front frame via handle fixing clips 113 so as to stand up straight.

The front handle frame is a single bent frame that exhibits high durability and is easy to manufacture, whereby production costs may be reduced.

Sixth, the rear handle frame 160 according to the present invention will be described.

The rear handle frame 160 is coupled to the left and right rear portions of the rear frame via the handle fixing clips 113 so as to stand up straight. Rear rotation control buttons are coupled to the outsides of rotating shafts formed at the left and right upper ends of the rear handle frame 160 in order to control the angle of a rear angle adjustment handle 162 in a stepwise manner.

The angle of the rear angle adjustment handle 162 is controlled in a stepwise manner through button adjustment type rotation. The angle of the rear angle adjustment handle 162 may be set according to the selection of a user in the state in which the rear rotation control buttons 161, which are located at the left and right sides of the rear handle frame, are pushed.

The rear angle adjustment handle is rotatable in ten stages from 0 degrees, at which the rear angle adjustment handle is folded in the state in which the rear angle adjustment handle is parallel to the rear support frame, to 180 degrees, at which the rear angle adjustment handle stands up straight in the opposite direction.

At the time of first-step rotation, the rear angle adjustment handle is rotated by 18 degrees. The angle of the rear angle adjustment handle may be adjusted in consideration of the height of a user, the position of the arms of the user, whether an upward slope or a downward slope is present, and whether the infant wagon is being pulled or pushed so as to move the infant wagon forward, whereby the force applied to the arms of the user may be minimized. In the wagon folding mode, the rear angle adjustment handle and the rear frame are disposed parallel to each other, whereby the volume of the infant wagon may be minimized.

Also, in the case in which the angle of the rear angle adjustment handle is set to be perpendicular when the rear handle frame is pushed to move the infant wagon, the distance between the feet of the caregiver and the infant wagon is increased as much as possible, whereby it is possible to prevent a kickback phenomenon in which the foot of the caregiver, which steps forward when the caregiver walks, collides with the infant wagon. Consequently, it is possible for the caregiver to walk comfortably and to improve the riding comfort of the infant.

Next, the wagon wheel unit 200 according to the present invention will be described.

The wagon wheel unit 200 is fastened to the front lower end and the rear lower end of the foldable main body frame in order to move the infant wagon.

As shown in FIG. 2, the wagon wheel unit includes a front wheel drive unit 210 and a rear wheel drive unit 220.

First, the front wheel drive unit 210 according to the present invention will be described.

The front wheel drive unit 210 is configured such that the distance between front wheels, coupled to the rear of the left and right lower ends of the front frame such that support shafts of the front wheels move in the rearward direction to support the front of the infant wagon, and the center of gravity of the infant wagon is reduced by 7 to 10 cm. The front wheel drive unit includes front wheel fixing frames 211, front wheel shock absorption frames 212, brake frames 213, and front wheels 214.

The front wheel fixing frames 211, each of which is formed in the shape of an elliptical cylinder, are coupled to the left and right lower ends of the front frame in a symmetrical fashion. Each of the front wheel fixing frames 211 is provided at the upper end thereof with a rotation fixing pin insertion recess 211a and a front wheel coupling pin 211b. Each of the front wheel fixing frames 211 supports the upper end of a front wheel elastic spring 212c, mounted under the front wheel fixing frame 211 inside the front wheel fixing frame 211. Each of the front wheel fixing frames 211 is axially coupled to a corresponding front wheel shock absorption frame 212, which is coupled to the lower end thereof.

The rotation fixing pin insertion recess 211a is formed at the lower end of the rotation fixing pin 112a-1, which is connected to the inside of the front wheel rotation fixing switch 112a so as to move in the upward-downward direction, such that the rotation fixing pin 112a-1 is inserted into or separated from the rotation fixing pin insertion recess 211a.

When the rotation fixing pin 112a-1 is inserted into the rotation fixing pin insertion recess 211a, the front wheels are not rotated in the horizontal direction but are fixed in the forward direction such that the infant wagon can be smoothly moved in a straight direction. When the rotation fixing pin 112a-1 is separated from the rotation fixing pin insertion recess 211a, the front wheels are not fixed in a specific direction but are rotatable 360 degrees in the horizontal direction, whereby it is possible to smoothly change the direction of the infant wagon and to reduce the amount of force necessary to change the direction of the infant wagon. Consequently, it is possible to reduce the fatigue of the caregiver.

The front wheel coupling pin 211b is inserted into the front wheel detachment pin insertion recess 112b-1, formed in one side of the lower end of a corresponding lower end three-axis support fixing member, vertically from above such that the front wheel drive unit 210 is coupled to the foldable main body frame 100.

Specifically, the front wheel coupling pin 211b is inserted into the front wheel detachment pin insertion recess 112b-1, and the inside of the front wheel detachment switch 112b is inserted and fixed into the coupling pin recess 211b-1, which is formed in one side of the upper end of the front wheel coupling pin 211b.

When the front wheel detachment switch 112b is moved upwards, the front wheel detachment switch 112b is separated from the coupling pin recess 211b-1, whereby the front wheel coupling pin 211b is separated from a corresponding lower end three-axis support fixing member 112. When the front wheel detachment switch 112b is moved downwards, the inside of the front wheel detachment switch 112b is inserted into the coupling pin recess 211b-1, whereby the front wheel coupling pin 211b is stably coupled to the corresponding lower end three-axis support fixing member 112.

In the wagon folding mode, therefore, the front wheel drive unit 210, which is a large protruding portion having a large volume, can be separated from the foldable main body frame 100, whereby it is possible to reduce the volume of the infant wagon 1. Consequently, it is possible to increase the efficiency of space utilization by the infant wagon and to easily store the infant wagon.

Each of the front wheel shock absorption frames 212 is formed in a '[' shape in section. Each of the front wheel shock absorption frames 212 is spaced apart from a corresponding front wheel in the upward direction and in the forward direction. Each of the front wheel shock absorption frames 212 is provided at one side of the front of the left and right sides thereof with a front wheel fixing shaft 212a, which is axially coupled to the side surface of a corresponding front wheel fixing frame. Each of the front wheel shock absorption frames 212 is provided at one side of the middle of the left and right sides thereof with a front wheel rotating shaft 212b, which is axially coupled to the side surface of a corresponding front wheel. Each of the front wheel shock absorption frames 212 supports the lower end of the front wheel elastic spring 212c, mounted inside in an upper portion of the front wheel shock absorption frame 212.

Each of the brake frames 213 is formed in a '[' shape in section. Each of the brake frames 213 is spaced apart from a corresponding front wheel in the upward direction and in the rearward direction. One side of the middle of the left and right sides of each of the brake frames 213 is coupled to the front wheel rotating shaft, and a brake pad 213a is formed at the rear of the upper end of each of the brake frames 213.

The brake pad 213a is provided at the lower end thereof with a plurality of brake pins 213a-1, each of which has a triangular section. The brake pins 213a-1 are arranged so as to protrude at uniform intervals in the horizontal direction.

When the brake pad is pushed downwards, the brake pins 213a-1 are moved downwards to come into contact with a corresponding front wheel 214, whereby frictional force is generated. Consequently, the rotation of the front wheels is restrained, and the front wheels are stopped. When the brake pad is moved upwards, the brake pins 213a-1 are separated from the corresponding front wheel 214, whereby it becomes possible to rotate the front wheel 214.

Consequently, it is possible to solve problems which occur when the caregiver wishes to stop the infant wagon while the caregiver pushes the infant wagon from the front of the infant wagon in the rearward direction to move the infant wagon and the caregiver must return to the rear of the infant wagon in order to step on the brake pad, exposing the infant wagon to danger while the caregiver returns to the rear of the infant wagon since the infant wagon is not stably fixed.

The left and right rotating shafts of each of the front wheels 214 is coupled to the front wheel rotating shaft 212b of a corresponding front wheel shock absorption frame so as to be rotatable. The front wheels 214 provide the force necessary to move the front part of the infant wagon.

Second, the rear wheel drive unit 220 according to the present invention will be described.

The rear wheel drive unit 220 is configured such that the distance between rear wheels, coupled to the fronts of the left and right lower ends of the rear frame such that support shafts of the rear wheels move in the forward direction to support the rear of the infant wagon, and the center of gravity of the infant wagon is reduced by 7 to 10 cm. The rear wheel drive unit 220 includes a first rear wheel drive unit 220a and a second rear wheel drive unit 230a.

The first rear wheel drive unit 220a is integrally coupled to one side of the front of the left and right lower ends of the rear frame, and first rear wheels for supporting the lower end of the rear of the infant wagon are detachably coupled to the ends of left and right rotating shafts of the first rear wheel drive unit. The first rear wheel drive unit 220a includes rear wheel fixing frames 221, rear wheel shock absorption frames 222, a rear wheel brake unit 223, and rear wheels 224.

The rear wheel fixing frames 221, each of which is formed in the shape of an elliptical cylinder, are coupled to the left and right lower ends of the rear frame in a symmetrical fashion. Each of the rear wheel fixing frames 221 is provided at the upper end thereof with a rear wheel coupling pin 221a. Each of the rear wheel fixing frames 221 supports the rear end of a rear wheel elastic spring 222c, mounted under the rear wheel fixing frames 221 inside the rear wheel fixing frames 221. Each of the rear wheel fixing frames 221 is axially coupled to a corresponding rear wheel shock absorption frame 222, which is located at the lower end thereof.

The rear wheel coupling pin 221a is inserted into the rear wheel detachment pin insertion recess 122a-1, and the rear wheel detachment switch 122a, which protrudes toward the inside of the rear wheel detachment pin insertion recess, is inserted and fixed into the coupling pin recess 221a-1, which is formed in one side of the upper end of the rear wheel coupling pin.

When the rear wheel detachment switch 122a is moved upwards, the rear wheel detachment switch 122a is separated from the coupling pin recess 221a-1, whereby the rear wheel detachment switch 122a is separated from a corresponding lower end three-axis support fixing member 122. When the rear wheel detachment switch 122a is moved downwards, the inside of the rear wheel detachment switch 122a is inserted into the coupling pin recess 221a-1, whereby the rear wheel coupling pin 221a is stably coupled to the corresponding lower end three-axis support fixing member 122.

In the wagon folding mode, therefore, the rear wheel drive unit 220, which is a large protruding portion having a large volume, can be separated from the foldable main body frame 100, whereby it is possible to reduce the volume of the infant wagon 1. Consequently, it is possible to increase the efficiency of space utilization by the infant wagon and to easily store the infant wagon.

Each of the rear wheel shock absorption frames 222 is formed in a '[' shape in section. Each of the rear wheel shock absorption frames 222 is coupled to the lower end of a corresponding rear wheel fixing frame. Each of the rear wheel shock absorption frames 222 is provided at one side of the rear thereof with a rear wheel fixing shaft 222a, which is axially coupled to the corresponding rear wheel fixing frame. Each of the rear wheel shock absorption frames 222 supports the rear wheel elastic spring 222c, which is connected to a rear wheel rotating shaft 222b disposed at one side of the front of the rear wheel shock absorption frame 222 and axially coupled to the rear wheel brake unit. The rear wheel brake unit is coupled to the inside of each of the rear wheel shock absorption frames 222, and each of the rear wheels is coupled to the outside of a corresponding rear wheel shock absorption frame 222.

The rear wheel brake unit 223 is configured such that a rod-shaped brake rotating shaft is horizontally coupled to the inside of each of the rear wheel shock absorption frames and such that the rear wheel brake unit 223 is provided at the middle thereof with a brake pad 223b, which has a rectangular surface, to control the rotation of the rear wheels 224.

The rear wheel brake unit 223 includes a brake rotating shaft 223a, a brake pad 223b, and rotating frames 223c.

The brake rotating shaft 223a is horizontally coupled to the insides of the rear wheel shock absorption frames, which are formed in a symmetrical fashion. Protruding wings 223a-1 are formed on circular rod-shaped front and rear sides of the brake rotating shaft 223a such that the brake rotating shaft 223a has a 'O'-shaped side section. First gears 223a-2 are coupled to the left and right ends of the brake rotating shaft 223a.

The protruding wings 223a-1 prevent the reduction of rotational force due to slippage at the coupling between the protruding wings 223a-1 and the brake pad 223b and prevent separation between the protruding wings 223a-1 and the brake pad 223b when the brake pad 223b, which is coupled to the middle of the brake rotating shaft and is rotatable under the control of the caregiver, is rotated. In addition, the protruding wings 223a-1 rotate the first gears 223a-2, which are coupled to the left and right ends of the brake rotating shaft 223a, with the same rotational force.

The upper section of the brake pad 223b is rectangular. The brake pad 223b is coupled to the middle of the brake rotating shaft in the state of being fitted on the brake rotating shaft in the lateral direction in order to rotate the brake rotating shaft under the control of the caregiver.

When the rear part of the brake pad 223b is stepped on and thus moved downwards, the brake rotating shaft 223a is rotated in the clockwise direction to rotate the first gears 223a-2 in the clockwise direction. When the front part of the brake pad 223b is stepped on and thus moved downwards, the brake rotating shaft 223a is rotated in the counterclockwise direction to rotate the first gears 223a-2 in the counterclockwise direction.

The brake pad 223b is spaced apart from the lower end of the rear frame, which is bent upwards so as to have a trapezoidal shape, by a distance of 20 to 30 cm in the vertical direction such that the caregiver can smoothly control the brake pad when moving or stopping the infant wagon.

In addition, the first gears 223a-2, which are formed at the left and right sides of the brake rotating shaft in a symmetrical fashion, are engaged with second gears 223c-1. When the brake pad 223b is rotated, therefore, the rotating frames 223c are stably rotated without the loss of rotational force.

Each of the rotating frames 223c is located at one side of the front of a corresponding rear wheel shock absorption frame. The second gears 223c-1, which are rotatably engaged with the first gears 223a-2 of the brake rotating shaft, are formed at the insides of the rotating frames 223c. Each of the rotating frames 223c is provided at one side of the lower end thereof with a brake pin 223c-2, which protrudes outwards so as to be inserted into or separated from a rotation control recess formed in a corresponding rear wheel in order to control the rotation of the rear wheel.

When the rear part of the brake pad is stepped on and thus moved downwards, the second gears, which are engaged with the first gears, which are rotated in the clockwise direction, are rotated in the counterclockwise direction, whereby the brake pins 223c-2, protruding outwards, are inserted into brake gears 224a, formed inside the rear wheels, to restrain the rotation of the rear wheels to thus stop the rotation of the rear wheels. When the front part of the brake pad is stepped on and thus moved downwards, the second gears, which are engaged with the first gears, which are rotated in the counterclockwise direction, are rotated in the clockwise direction, whereby the brake pins 223c-2 protruding outwards are separated from the brake gears 224a, and therefore the rear wheels are rotatable.

Figure 15:
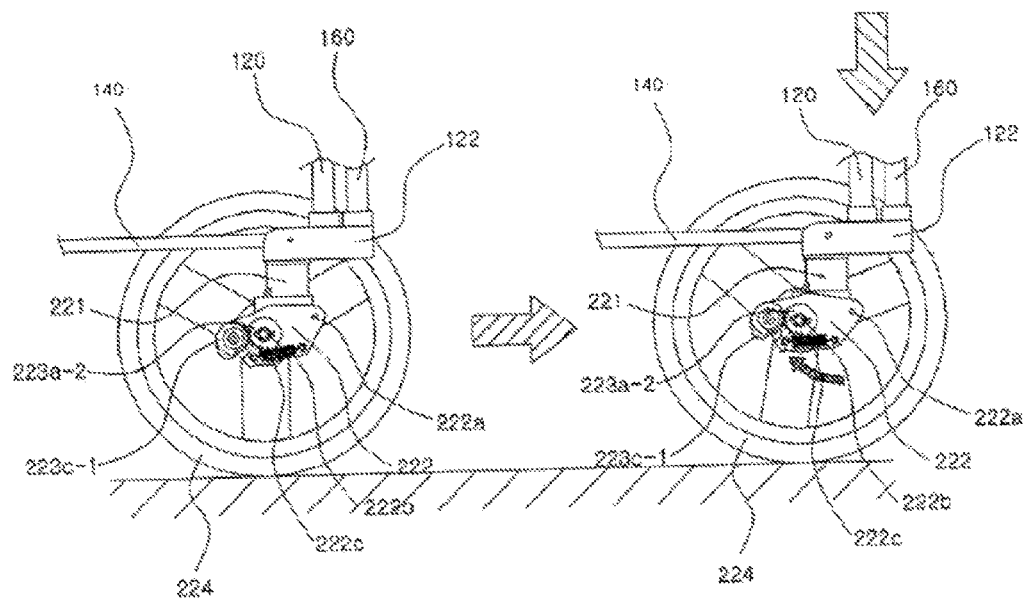
FIG. 15 is a side view showing an embodiment in which the rear wheel shock absorption frame is rotated in the counterclockwise direction with respect to the rear wheel fixing shaft in order to absorb shocks when a load is applied to the first rear wheel drive unit according to the present invention.
Figure 16:
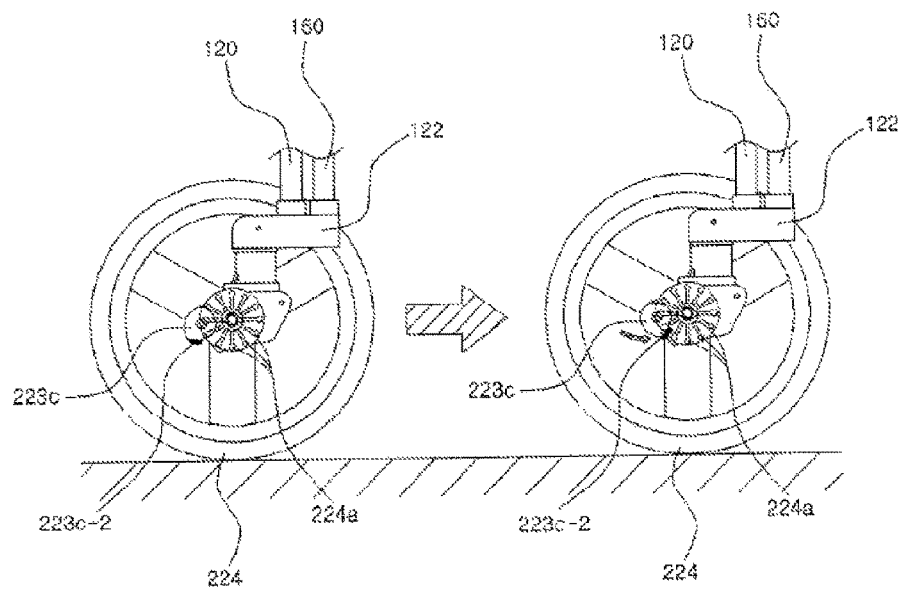
FIG. 16 is a side view showing an embodiment in which the first rear wheel drive unit according to the present invention is rotated in the counterclockwise direction such that a brake pin is inserted into a brake gear of a rear wheel.
Figure 17:
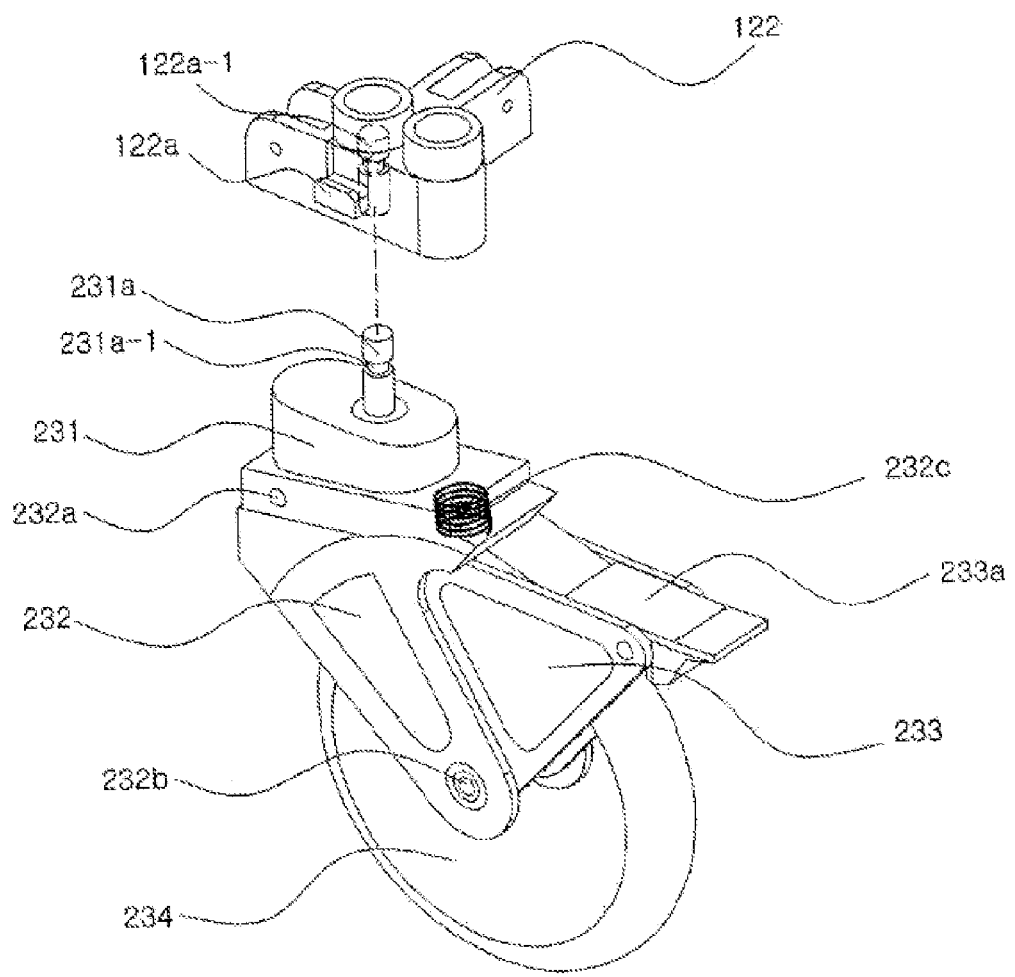
FIG. 17 is a perspective view showing the structural elements of the second rear wheel drive unit, which is coupled to the lower end of the rear frame according to the present invention.
Figure 18:
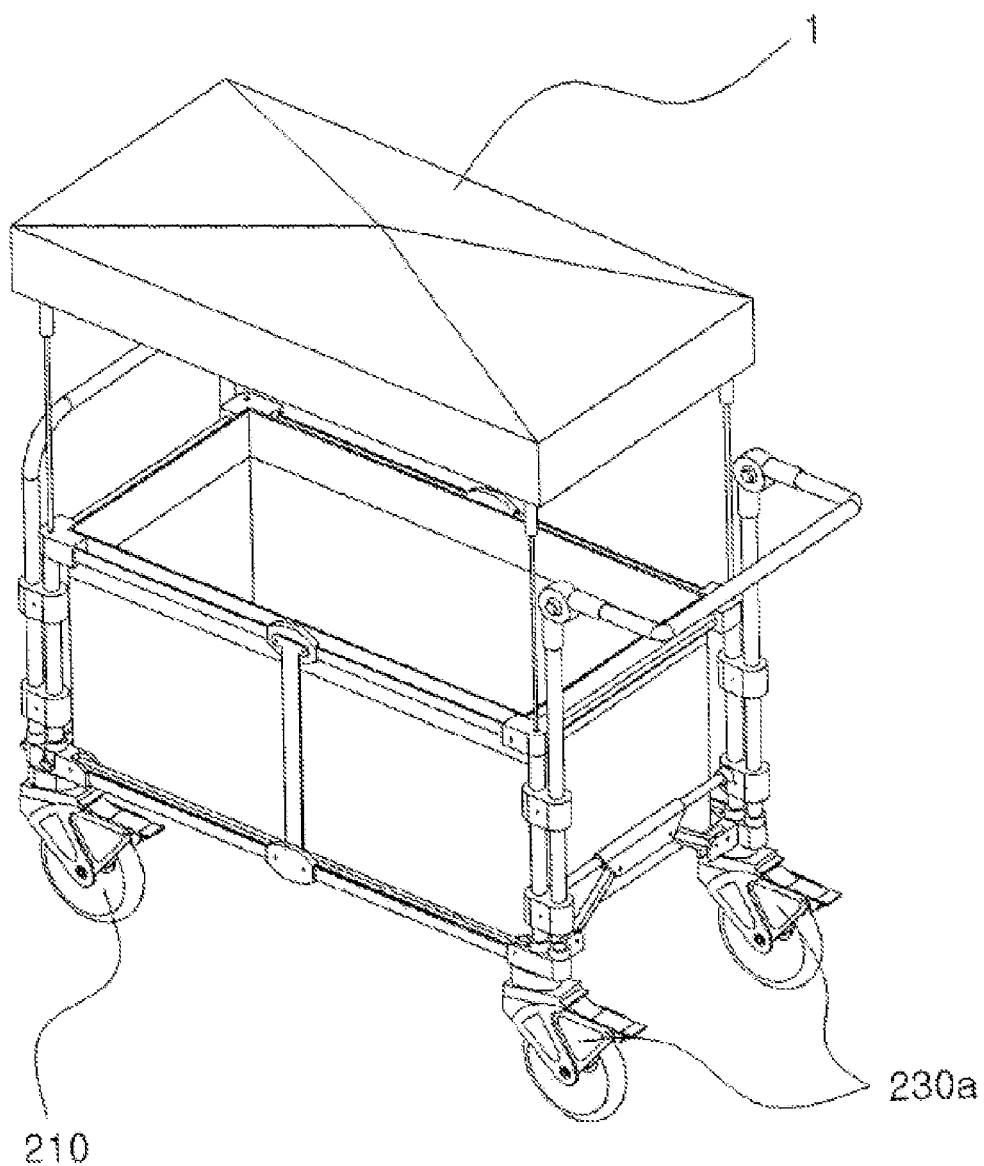
FIG. 18 is a perspective view showing the overall shape of the infant wagon having improved convenience of use, to which the second rear wheel drive unit according to the present invention is coupled.
Figure 19:
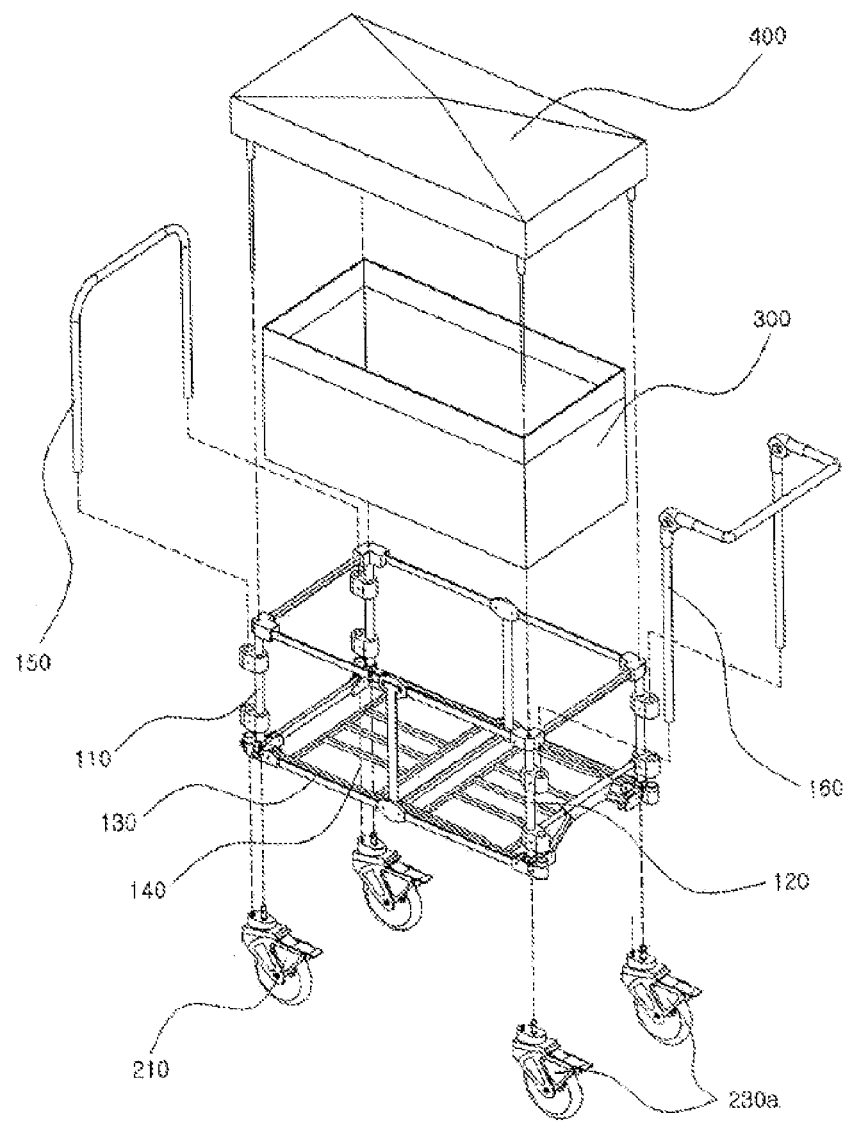
FIG. 19 is an exploded perspective view showing the structural elements of the infant wagon, to which the second rear wheel drive unit according to the present invention is selectively coupled.
Figure 20:
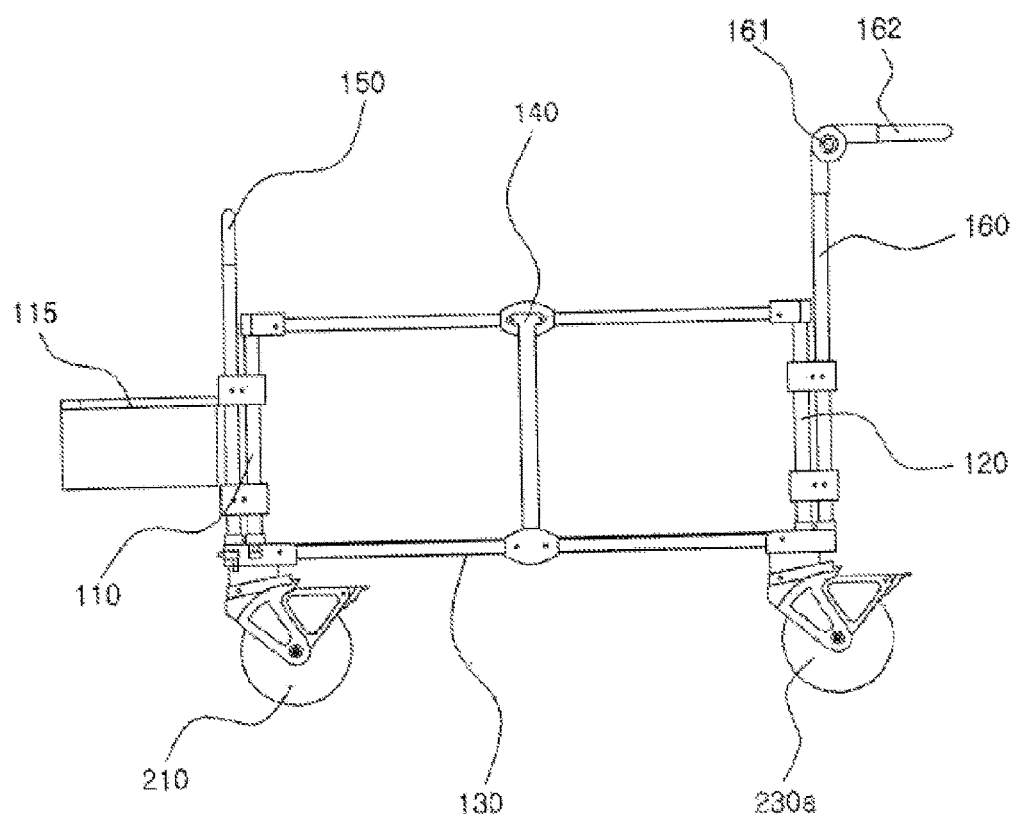
FIG. 20 is a side view showing the foldable main body frame according to the present invention and the wagon wheel unit, to which the second rear wheel drive unit is selectively coupled.

As shown in FIGS. 15 and 16, the rotation of the rear wheels is completely interrupted by the brake pins 223c-2 inserted into the brake gears 224a, whereby slippage is prevented from occurring. Unless the brake gears are separated, braking is not released, whereby it is possible to reliably stop the infant wagon 1.

The rear wheels 224 are rotated in the state in which the left and right rotating shafts of the rear wheels 224 are coupled to the rotating shafts of the rear wheel shock absorption frames to provide the force necessary to move the rear part of the infant wagon.

A circular push button type detachment button 224b is formed at the center of the outer surface of each of the rear wheels. Semi-arc type detachment pins 224c protrude from the inside of each of the rear wheels so as to be spaced apart from each other in a symmetrical fashion. The semi-arc type detachment pins 224c are connected to the detachment button 224b. Pin protrusions 224c-1 are formed along the ends of the semi-arc type detachment pins.

When the detachment button 224b is pushed inwards, the semi-arc type detachment pins 224c, which are spaced apart from each other, move in the central direction, whereby the radius of the pin protrusions 224c-1 is reduced. As a result, the pin protrusions 224c-1 are separated from the rear wheel rotating shaft 222b disposed at the outside of the rear wheel shock absorption frame 222, whereby each of the rear wheels is separated from the corresponding rear wheel shock absorption frame 222. When the pin protrusions 224c-1 are inserted into the end of the rear wheel rotating shaft 222b, located at the outside of the rear wheel shock absorption frame, from which the corresponding rear wheel is separated, in the state in which the semi-arc type detachment pins move in the central direction by pushing the detachment button 224b, the pin protrusions 224c-1 of the semi-arc type detachment pins are fixed into the inner recess, whereby each of the rear wheels is coupled to the corresponding rear wheel shock absorption frame 222.

The first rear wheel drive unit 220a according to the present invention is configured: such that the detachment button 224b, formed at the center of the outer surface of each of the rear wheels, is pushed such that the semi-arc type detachment pins 224c, coupled to each other in the inward direction in the state of being spaced apart from each other in a symmetrical fashion, move in the central direction to separate the pin protrusions 224c-1, which are coupled to each of the rear wheel shock absorption frames 222, from the rear wheel shock absorption frame, whereby the rear wheels are primarily separated and coupled; and such that the rear wheel detachment pin 221b-1 of the detachment grip, which is inserted into the outer through hole in the outer rear wheel support frame, which is aligned with the inner through hole 122a-1 in the inner rear wheel support frame, is separated and coupled to secondarily separate and couple the entirety of the rear wheel drive unit.

Consequently, the first rear wheel drive unit of the infant wagon is separated in a stepwise manner such that the volume and weight of the infant wagon are reduced, whereby it is possible to easily carry and store the infant wagon. In addition, it is possible to partially disassemble the rear wheel drive unit when the rear wheel drive unit is worn or broken, thereby reducing replacement costs.

The second rear wheel drive unit 230a is detachably coupled to one side of the front of the left lower end of the rear frame and to one side of the front of the right lower end of the rear frame. Rear wheels for supporting the lower end of the rear of the infant wagon are formed at a rotating shaft coupled to the middle of the lower end of the second rear wheel drive unit 230a. The second rear wheel drive unit 230a includes rear wheel fixing frames 231, rear wheel shock absorption frames 232, brake frames 233, and rear wheels 234.

The rear wheel fixing frames 231, each of which is formed in the shape of an elliptical cylinder, are coupled to the left and right lower ends of the rear frame in a symmetrical fashion. Each of the rear wheel fixing frames 221 is provided at the upper end thereof with a rear wheel coupling pin 231a. Each of the rear wheel fixing frames 221 supports the upper end of a rear wheel elastic spring 232c, mounted under the rear wheel fixing frames 231 inside the rear wheel fixing frames 231. Each of the rear wheel fixing frames 231 is axially coupled to a corresponding rear wheel shock absorption frame 232, which is coupled to the lower end thereof.

The rear wheel coupling pin 231a is inserted into the rear wheel detachment pin insertion recess 122a-1, formed in one side of the lower end of a corresponding lower end three-axis support fixing member, vertically from above such that the rear wheel drive unit 220 is coupled to the foldable main body frame 100.

Specifically, the rear wheel coupling pin 221a is inserted into the rear wheel detachment pin insertion recess 122a-1, and a rear wheel detachment bar 122a-2, which protrudes toward the inside of the rear wheel detachment pin insertion recess 122a-1, is inserted and fixed into the coupling pin recess 231a-1, which is formed in one side of the upper end of the rear wheel coupling pin 231a.

When the rear wheel detachment switch 122a is moved upwards, the rear wheel detachment bar 122a-2 (not shown) is separated from the coupling pin recess 221a-1, whereby the rear wheel coupling pin 221a is separated from the corresponding lower end three-axis support fixing member 122. When the rear wheel detachment switch 122a is moved downwards, the rear wheel detachment bar 122a-2 is inserted into the coupling pin recess 221a-1, whereby the rear wheel coupling pin 221a is stably coupled to the corresponding lower end three-axis support fixing member 122.

In the wagon folding mode, therefore, the second rear wheel drive unit 230a, which is a large protruding portion having a large volume, can be separated from the foldable main body frame 100, whereby it is possible to reduce the volume of the infant wagon 1. Consequently, it is possible to increase the efficiency of space utilization by the infant wagon and to easily store the infant wagon.

Each of the rear wheel shock absorption frames 232 is formed in a '[' shape in section. Each of the rear wheel shock absorption frames 232 is spaced apart from the corresponding rear wheel in the upward direction and in the forward direction. Each of the rear wheel shock absorption frames 232 is provided at one side of the front of the left and right sides thereof with a rear wheel fixing shaft 232a, which is axially coupled to the side surface of the corresponding wheel fixing frame. Each of the rear wheel shock absorption frames 232 is provided at one side of the middle of the left and right sides thereof with a rear wheel rotating shaft 232b, which is axially coupled to the side surface of the corresponding rear wheel. Each of the rear wheel shock absorption frames 232 supports the lower end of the rear wheel elastic spring 232c, mounted inside in an upper portion of the rear wheel shock absorption frames 232.

Each of the brake frames 233 is formed in a '[' shape in section. Each of the brake frames 233 is spaced apart from the corresponding rear wheel in the upward direction and in the rearward direction. One side of the middle of the left and right sides of each of the brake frames 233 is coupled to the rear wheel rotating shaft, and a brake pad 233a is formed at the rear of the upper end of each of the brake frames 233.

The brake pad 233a is provided at the lower end thereof with a plurality of brake pins 233a-1, each of which has a triangular section. The brake pins 233a-1 are arranged so as to protrude at uniform intervals in the horizontal direction.

When the brake pad is pushed downwards, the brake pins 233a-1 are moved downwards to come into contact with the corresponding rear wheel 234, whereby frictional force is generated. Consequently, the rotation of the rear wheels is restrained, and the rear wheels are stopped. When the brake pad is moved upwards, the brake pins 233a-1 are separated from the corresponding rear wheel, whereby it becomes possible to rotate the rear wheels.

Consequently, it is possible to solve problems which occur when the caregiver wishes to stop the infant wagon while the caregiver pushes the infant wagon from the rear of the infant wagon in the forward direction to move the infant wagon and the caregiver must return to the rear of the infant wagon in order to step on the brake pad, exposing the infant wagon to danger while the caregiver returns to the rear of the infant wagon, since the infant wagon is not stably fixed.

The left and right rotating shafts of each of the rear wheels 234 is coupled to the rear wheel rotating shaft 232b of a corresponding rear wheel shock absorption frame so as to be rotatable. The rear wheels 234 provide the force necessary to move the rear part of the infant wagon.

The second rear wheel drive unit 230a according to the present invention is configured to be separated from and coupled to the left and right sides of the rear frame via the rear wheel detachment switches 122a in the same manner as the front wheel drive unit 210.

Consequently, the second rear wheel drive unit of the infant wagon is separated such that the volume and weight of the infant wagon are reduced, whereby it is possible to easily carry and store the infant wagon. In addition, it is possible to replace the rear wheel drive unit with a spare front wheel drive unit when the rear wheel drive unit is worn or broken, thereby reducing replacement costs.

The wagon wheel unit 200 according to the present invention is configured such that the axial distance between the front wheel drive unit, which supports the front of the infant wagon, and the rear wheel drive unit, which supports the rear of the infant wagon, is reduced by 14 to 20 cm, whereby it is possible to reduce the burden applied to the arms of the caregiver when the infant wagon is moved or when the direction of the infant wagon is changed, and such that the radius of rotation of the infant wagon is reduced, whereby it is possible to easily change the direction of the infant wagon.

The reason that the axial distance between the front wheel drive unit and the rear wheel drive unit is reduced by 14 to 20 cm is that, if the axial distance is reduced by less than 14 cm, there is little difference in the force applied to the arms of the caregiver and the radius of rotation of the infant wagon, whereby it is difficult to move the infant wagon and to change the direction of the infant wagon and that, if the axial distance is reduced by greater than 20 cm, the ratio of the axial distance to the forward-rearward length of the infant wagon is decreased, whereby it is difficult to stably move the infant wagon and the infant wagon may fall down in the direction in which the infant wagon is turned when the direction of the infant wagon is changed.

Next, the seat unit 300 according to the present invention will be described.

The seat unit 300 is formed in the shape of a rectangular basket. The seat unit 300 is coupled and fixed to the inner circumference and the lower end of the foldable main body frame using snap fasteners, buckles, or Velcro® members. The seat unit 300 serves to provide a space in which the infant takes a comfortable rest in the infant wagon.

The seat unit has a thickness of 5 mm to 10 mm. The seat unit is configured so as to have folding lines such that the seat unit can be folded in the folding mode of the foldable main body frame. The seat unit is provided at the center of the inner surface thereof with a foldable ring.

If the thickness of the seat unit is less than 5 mm, the seat unit cannot appropriately serve as a cushion, such that vibrations and impacts are directly transmitted to the infant during the movement of the infant wagon. If the thickness of the seat unit is greater than 10 mm, the foldable main body frame is not smoothly folded, whereby the volume of the infant wagon is increased.

A five-point coupling type safety belt is formed at the front and the rear of the inside of the seat unit according to the present invention so as to face the same, whereby the shoulders, the waist, and the thighs of the infant are supported so as not to shake.

The five-point coupling type safety belt is configured to surround the entirety of the upper body. Consequently, infants and children of various ages, including infants, who cannot hold themselves upright, as well as older children, can ride in the infant wagon.

Next, the canopy unit 400 according to the present invention will be described.

The canopy unit 400 has rectangular sides and a quadrangular pyramid-shaped roof. The canopy unit 400 is detachably coupled to the upper end of the foldable main body frame to protect the infant from sunlight, rain, wind, and the like.

Hereinafter, the operation of the infant wagon having improved convenience of use according to the present invention will be described in detail.

First, the side frames and the support frame of the infant wagon in the wagon folding mode, in which the infant wagon is stored, are unfolded in the forward-rearward direction in order to open the infant wagon.

Subsequently, the front wheel detachment switches of the lower end three-axis support fixing members located at the front of the infant wagon are moved upwards, and then the front wheel coupling pins are inserted into the lower end three-axis support fixing members. After that, the front wheel detachment switches are moved downwards such that front wheel detachment bars are inserted and fixed into the coupling pin recesses.

At this time, the front wheel drive unit is configured such that the support shafts of the front wheels move in the rearward direction to reduce the distance between the front wheels and the center of gravity of the infant wagon by 7 to 10 cm, whereby it is possible to reduce the burden applied to the arms of the caregiver when the infant wagon is moved or when the direction of the infant wagon is changed. In addition, the radius of rotation of the infant wagon is reduced, whereby it is possible to easily change the direction of the infant wagon.

Subsequently, one of the first rear wheel drive unit or a second rear wheel drive unit is selected and coupled to the lower ends of the lower end three-axis support fixing members located at the rear of the foldable main body frame.

In order to move the infant wagon in the state in which an infant is put in the infant wagon, the first rear wheel drive unit, which exhibits high grip force and is capable of reducing the shaking of the infant wagon, is coupled to the lower end three-axis support fixing members. In order to move the infant wagon in the state in which a load is put in the infant wagon, the second rear wheel drive unit, which is relatively lightweight and is capable of easily changing the direction of the infant wagon, is coupled to the lower end three-axis support fixing members.

When the rear wheels are worn or damaged while the first rear wheel drive unit is used in the state of being coupled to the lower end three-axis support fixing members, only the rear wheels are separated and replaced with new rear wheels. When the infant wagon is carried or stored, the entirety of the first rear wheel drive unit is separated and stored.

When the rear wheels become worn or damaged while the second rear wheel drive unit is used in the state of being coupled to the lower end three-axis support fixing members, the second rear wheel drive unit is separated and replaced with a spare front wheel drive unit, which is compatible with the second rear wheel drive unit. When the infant wagon is carried or stored, the second rear wheel drive unit is separated and stored.

At this time, the rear wheel drive unit is configured such that the support shafts of the rear wheels move in the forward direction to reduce the distance between the rear wheels and the center of gravity of the infant wagon by 7 to 10 cm, whereby it is possible to reduce the burden applied to the arms of the caregiver when the infant wagon is moved or when the direction of the infant wagon is changed. In addition, the radius of rotation of the infant wagon is reduced, whereby it is possible to easily change the direction of the infant wagon.

Subsequently, the canopy fixing poles are installed at the upper ends of the front frame and the rear frame, and then the canopy unit is coupled to the canopy fixing poles by fitting the canopy unit on the canopy fixing poles.

Subsequently, the shoulders, the waist, and the thighs of the infant are supported using the five-point coupling type safety belt so as not to shake.

Subsequently, the angle of the rear angle adjustment handle is adjusted so as to make it easy to push or pull the infant wagon. When the infant wagon is moved from the forward end and stopped, the infant wagon is controlled using the front brake pad. When the infant wagon is moved from the rearward end and stopped, the infant wagon is controlled using the rear brake pad.

Subsequently, after the infant wagon is used, the infant is moved to a safe place, the canopy unit is separated from the infant wagon, the canopy fixing poles are inserted into the front frame and the rear frame, and the foldable ring, which is formed at the center of the seat unit, is pulled to fold the infant wagon.

In addition, the front wheel drive unit is separated through the front wheel detachment switches, the rear wheel drive unit is separated through the rear wheel detachment switches, the basket coupled to the front of the infant wagon is folded, and the angle adjustment handle of the rear handle frame is rotated so as to be parallel to the rear frame.

Finally, the infant wagon in the wagon folding mode, in which the volume of the infant wagon is minimized, is put in the trunk of a car.

INDUSTRIAL APPLICABILITY

The present invention provides an infant wagon having improved convenience of use, wherein the infant wagon is configured such that the axial distance between front wheels and rear wheels thereof is reduced. Therefore, it is possible to reduce the burden applied to the arms of a caregiver when the infant wagon is moved or when the direction of the infant wagon is changed, and the radius of rotation of the infant wagon is reduced, whereby it is possible to easily change the direction of the infant wagon. When the infant wagon is pushed from the rear thereof to move the infant wagon, it is possible to prevent as much as possible the foot of the caregiver, which steps forward, from colliding with a rear frame of the infant wagon. The wheels are easily attached and detached, whereby it is possible to easily switch between a usage mode and a storage mode, and such that, when the wheels are worn or damaged, it is possible to easily replace the wheels. Consequently, the present invention has high industrial applicability.

The invention claimed is:

1. A wagon having improved convenience of use, configured for carrying a baby, the wagon comprising a foldable main body frame, a wagon wheel assembly, a seat assembly, and a canopy assembly wherein the foldable main body frame comprises:
a front frame, which is a square or rectangular shaped frame disposed at a front end of the foldable main body frame so as to stand up straight in order to support a front of the foldable main body frame;
a rear frame having an upper frame part, a left side frame part connected to one end of the upper frame part, a right side frame part connected to another end of the upper frame part, and a lower end frame part connected to the left and right side frame parts, and disposed at a rear end of the foldable main body frame so as to stand up straight, the lower end frame part of the rear frame being bent upwards so as to have a trapezoidal shaped recess, the rear frame being configured to support a rear of the foldable main body frame;

a support frame, which is a rectangular frame coupled to inside lower ends of the front frame and the rear frame respectively, the support frame comprising a wagon middle shaft disposed at a middle thereof with respect to a forward-rearward direction, the support frame further comprising a front support frame and a rear support frame configured to be folded or unfolded in a symmetrical fashion in order to vary a shape of the support frame according to upward and downward movement of the wagon middle shaft;

side frames, each side frame having an upper side frame disposed horizontally and axially coupled to an upper end of the front frame and to an upper end of the rear frame in a symmetrical fashion, a lower side frame disposed horizontally and axially coupled to a lower end of the front frame and to a lower end of the rear frame in a symmetrical fashion, and a vertical connection frame, which stands up straight, having an upper end and a lower end axially coupled to a middle of the upper side frame and to a middle of the lower side frame, respectively;

a front handle frame, which is an inversed U-shaped frame located in front of the front frame, the front handle frame being coupled to a left and a right front portions of the front frame via handle fixing clips so as to stand up straight; and a rear handle frame, which is an inversed U-shaped frame located at a rear of the rear frame, the rear handle frame being coupled to a left and a right rear portions of the rear frame via handle fixing clips so as to stand up straight, the rear handle frame being configured such that rotation control buttons are coupled to outsides of rotating shafts disposed at a left and a right upper ends of the rear handle frame in order to control an angle of a rear angle adjustment handle in a stepwise manner, wherein the wagon wheel assembly comprises:

a front wheel drive assembly configured such that a distance between front wheels, coupled to a rear of a left and a right lower ends of the front frame such that support shafts of the front wheels move in a rearward direction to support a front of the wagon, and a center of gravity of the wagon is reduced by 7 to 10 cm; and a rear wheel drive assembly configured such that a distance between rear wheels, coupled to a front of a left and a right lower ends of the rear frame such that support shafts of the rear wheels move in a forward direction to support a rear of the wagon, and the center of gravity of the wagon is reduced by 7 to 10 cm, and wherein the rear wheel drive assembly comprises one of a first rear wheel drive assembly or a second rear wheel drive assembly, wherein the first rear wheel drive assembly is integrally coupled to one side of the front of the left and right lower ends of the rear frame, and has first rear wheels for supporting a lower end of the rear of the wagon detachably coupled to ends of a left and a right rotating shafts of the first rear wheel drive assembly, and wherein the second rear wheel drive assembly is detachably coupled to one side of the front of the left lower end of the rear frame and to one side of the front of the right lower end of the rear frame, and has second rear wheels for supporting the lower end of the rear of the wagon disposed at a rotating shaft coupled to a middle of a lower end of the second rear wheel drive assembly.

2. The wagon according to claim 1, wherein the first rear wheel drive assembly comprises:

rear wheel fixing frames fitted on inner rear wheel support frames, disposed at the left and right lower ends of the rear frame, each of the rear wheel fixing frames having an elliptical cylinder shape, a rear wheel detachment grip being coupled to a rear of each of the rear wheel fixing frames, each of the rear wheel fixing frames being configured to support a rear end of a rear wheel elastic spring mounted under the rear wheel fixing frame inside the rear wheel fixing frame, the rear wheel fixing frames being axially coupled to rear wheel shock absorption frames, which are located at a lower end thereof;

rear wheel shock absorption frames, each of which is formed in a bracket shape in section, each of the rear wheel shock absorption frames being coupled to a lower end of a corresponding rear wheel fixing frame, each of the rear wheel shock absorption frames being provided at one side of a rear thereof with a rear wheel fixing shaft axially coupled to the corresponding rear wheel fixing frame, each of the rear wheel shock absorption frames being configured to support the rear wheel elastic spring connected to a rear wheel rotating shaft disposed at one side of a front of the rear wheel shock absorption frame and axially coupled to a rear wheel brake assembly, the rear wheel brake assembly being coupled to an inside of each of the rear wheel shock absorption frames, each of the rear wheels being coupled to an outside of a corresponding rear wheel shock absorption frame;

a rear wheel brake assembly configured such that a rod-shaped brake rotating shaft is horizontally coupled to an inside of each of the rear wheel shock absorption frames, the rear wheel brake assembly being provided at a middle thereof with a brake pad which has a rectangular surface to control rotation of the rear wheels; and rear wheels configured to be rotated in a state in which the left and the right rotating shafts of the rear wheels are coupled to the respective rotating shafts of the rear wheel shock absorption frames in order to provide force necessary to move a rear part of the wagon.

3. The wagon according to claim 2, wherein the rear wheel brake assembly comprises:

a brake rotating shaft horizontally coupled to insides of the rear wheel shock absorption frames, which are disposed in a symmetrical fashion, protruding wings being disposed on circular rod-shaped front and rear sides of the brake rotating shaft such that the brake rotating shaft has a side section having at least one circumference and at least one protrusion extended from the circumference, and first gears being coupled to left and right ends of the brake rotating shaft;

a brake pad having a rectangular upper section, the brake pad being coupled to a middle of the brake rotating shaft in a state of being fitted on the brake rotating shaft in a lateral direction in order to rotate the brake rotating shaft under control of a caregiver; and rotating frames, each of which is disposed at one side of a rear of a corresponding one of the rear wheel shock absorption frames, the rotating frames being provided with second gears rotatably engaged with the first gears of the brake rotating shaft, each of the rotating frames being provided at one side of a lower end thereof with a brake pin which protrudes outwards so as to be inserted into or separated from a rotation control recess disposed in a corresponding rear wheel in order to control rotation of the rear wheels.

4. The wagon according to claim 1, wherein the first rear wheel drive assembly is configured:

such that a detachment button, disposed at a center of an outer surface of each of the rear wheels, is pushed such that semi-arc type detachment pins, coupled to each other in an inward direction while being spaced apart from each other in a symmetrical fashion, move in a central direction to separate pin protrusions, coupled to each of the rear wheel shock absorption frames, from a corresponding rear wheel shock absorption frame, whereby the rear wheels are primarily separated and coupled; and such that a rear wheel detachment pin of a detachment grip, which is inserted into an outer through hole formed in the outer rear wheel support frame, which is aligned with an inner through hole formed in the inner rear wheel support frame, is separated and coupled to secondarily separate and couple an entirety of the rear wheel drive assembly.

* * * * *